United States Patent [19]

Dreyer et al.

[11] Patent Number: 5,987,461
[45] Date of Patent: Nov. 16, 1999

[54] CO-MAILING OF DIVERSE PUBLICATIONS USING AN ELECTRONIC PRESS

[75] Inventors: Mark G. Dreyer, Aurora; James L. Warmus, LaGrange, both of Ill.

[73] Assignee: R.R. Donnelley & Sons Company, Lisle, Ill.

[21] Appl. No.: 08/751,108

[22] Filed: Nov. 15, 1996

Related U.S. Application Data

[63] Continuation-in-part of application No. 08/478,397, Jun. 7, 1995.

[51] Int. Cl.⁶ .................................................. G06F 17/30
[52] U.S. Cl. ............................ 707/7; 707/506; 395/148; 395/761
[58] Field of Search .................................... 395/200, 607, 395/148, 761; 364/555.01, 464.16; 707/7, 506

[56] References Cited

U.S. PATENT DOCUMENTS

| | | | |
|---|---|---|---|
| Re. 32,690 | 6/1988 | Wong ........................................ | 270/54 |
| 3,608,888 | 9/1971 | McCain et al. ........................... | 270/54 |
| 3,774,758 | 11/1973 | Sternberg ................................. | 209/3.3 |
| 3,774,901 | 11/1973 | McCain et al. ........................... | 270/54 |
| 3,809,385 | 5/1974 | Rana ........................................ | 270/54 |
| 3,819,173 | 6/1974 | Anderson et al. ........................ | 270/54 |
| 3,872,460 | 3/1975 | Fredrickson et al. .................... | 345/1 |
| 3,891,492 | 6/1975 | Watson .................................... | 156/351 |
| 3,899,165 | 8/1975 | Abram et al. ............................. | 270/54 |
| 3,953,017 | 4/1976 | Wise ........................................ | 270/54 |
| 4,022,455 | 5/1977 | Newsome et al. ........................ | 270/54 |
| 4,095,780 | 6/1978 | Gaspar et al. ............................ | 270/73 |

(List continued on next page.)

FOREIGN PATENT DOCUMENTS

PCT/US86/00242 8/1986 WIPO .

OTHER PUBLICATIONS

Ultimate Technographics, Inc. Manual, "Poststrip," 1989.
Dieckmann, Glenn, "Press Imposition for IBM 4250, General Information," R.R. Donnelley & Sons Company, Crawfordsville Manufacturing Division, Department CHT, Feb. 21, 1989.
Alpha Four, New Version 3, "True Relational Database Power Without Programming, Reference Manual," Alpha Software Corporation, Lesson 20: Using Sets and Lesson 22: Advanced Sets: One–to–Many Links, 1993.
"Design Your Forms, Power With Room To Grow: Xbasic™," advertisement, DBMS Magazine, Sep. 1994.
Xeikon announcement, "Xeikon announces new RIP for the DCP–1 digital color press," Sep. 13, 1994.
"Finding the Right Niches for Electronic Printing," *The Seybold Report on Desktop Publishing*, Mar. 7, 1994, pp. 12–18.
*Seybold Report on Publishing Systems*, vol. 25, No. 22, ISSN 0736–7260, Aug. 26, 1996.
Barco Graphics brochure, "RIP and Electronic Collation System for Xeikon DCP 1 Digital Printing Press," Feb. 2, 1994, with Addendum 1.
Xeikon brochure, "Beta Specifications, Xeikon DCP–1 Digital Color Press," date unknown.
U.S. Patent Application, "Variable Imaging Using an Electronic Press," Serial No. 08/478,397, filed Jun. 7, 1995.

*Primary Examiner*—Thomas G. Black
*Assistant Examiner*—Diane D. Mizrahi
*Attorney, Agent, or Firm*—Marshall, O'Toole, Gerstein, Murray & Borun

[57] ABSTRACT

A press controller for operating an electronic press to produce a plurality of diverse publications from data stored in associated publication databases establishes a job database having data from the publication databases stored therein and controls the electronic press in accordance with the data in the job database. The present invention allows books of diverse publications to be co-mailed and thereby obtain postal discounts.

15 Claims, 21 Drawing Sheets

U.S. PATENT DOCUMENTS

| | | | |
|---|---|---|---|
| 4,117,975 | 10/1978 | Gunn | 235/494 |
| 4,121,818 | 10/1978 | Riley et al. | 270/54 |
| 4,168,776 | 9/1979 | Hoeboer | 270/52.29 |
| 4,168,828 | 9/1979 | McLear | 270/54 |
| 4,247,008 | 1/1981 | Dobbs | 209/569 |
| 4,338,768 | 7/1982 | Ballestrazzi et al. | 53/495 |
| 4,395,031 | 7/1983 | Gruber et al. | 270/54 |
| 4,413,724 | 11/1983 | Fellner | 198/594 |
| 4,426,072 | 1/1984 | Cole et al. | 270/53 |
| 4,482,142 | 11/1984 | McCain et al. | 270/54 |
| 4,483,526 | 11/1984 | Bulka et al. | 270/54 |
| 4,484,733 | 11/1984 | Loos et al. | 270/54 |
| 4,495,582 | 1/1985 | Dessert et al. | 364/469 |
| 4,500,083 | 2/1985 | Wong | 270/54 |
| 4,519,598 | 5/1985 | McCain et al. | 270/53 |
| 4,536,176 | 8/1985 | Gaspar | 493/365 |
| 4,537,342 | 8/1985 | McCain et al. | 227/78 |
| 4,552,349 | 11/1985 | Loos et al. | 270/54 |
| 4,554,044 | 11/1985 | Gaspar et al. | 156/510 |
| 4,556,595 | 12/1985 | Ochi | 428/143 |
| 4,567,988 | 2/1986 | Weibel | 209/569 |
| 4,601,003 | 7/1986 | Yoneyama et al. | 364/518 |
| 4,601,394 | 7/1986 | Hutner | 209/3.3 |
| 4,672,462 | 6/1987 | Yamada | 358/280 |
| 4,674,052 | 6/1987 | Wong et al. | 364/466 |
| 4,677,571 | 6/1987 | Reisman | 395/109 |
| 4,718,784 | 1/1988 | Drisko | 400/68 |
| 4,727,402 | 2/1988 | Smith | 355/14 SH |
| 4,729,037 | 3/1988 | Doelves | 358/299 |
| 4,768,766 | 9/1988 | Berger et al. | 270/58 |
| 4,789,147 | 12/1988 | Berger et al. | 270/1.1 |
| 4,827,315 | 5/1989 | Woldberg et al. | 346/160 |
| 4,900,001 | 2/1990 | Lapeyre | 270/1.1 |
| 4,903,139 | 2/1990 | Minter | 358/296 |
| 4,910,612 | 3/1990 | Yamazaki | 358/496 |
| 4,928,252 | 5/1990 | Gabbe et al. | 395/102 |
| 4,930,077 | 5/1990 | Fan | 395/759 |
| 4,937,761 | 6/1990 | Hassett | 345/468 |
| 4,948,109 | 8/1990 | Petersen | 270/1.1 |
| 4,968,993 | 11/1990 | Wolfberg et al. | 346/160 |
| 4,984,948 | 1/1991 | Lindsay et al. | 412/1 |
| 5,001,500 | 3/1991 | Wolfberg et al. | 346/160 |
| 5,005,124 | 4/1991 | Connell | 395/201 |
| 5,021,975 | 6/1991 | Yamanashi | 239/9 |
| 5,028,192 | 7/1991 | Lindsay et al. | 412/1 |
| 5,031,891 | 7/1991 | Kobler et al. | 270/54 |
| 5,039,075 | 8/1991 | Mayer | 270/1.1 |
| 5,043,749 | 8/1991 | Punater et al. | 346/153.1 |
| 5,054,984 | 10/1991 | Chan et al. | 412/1 |
| 5,056,767 | 10/1991 | Emigh et al. | 270/58 |
| 5,067,024 | 11/1991 | Anzai | 358/296 |
| 5,068,797 | 11/1991 | Sansone | 364/478.07 |
| 5,072,401 | 12/1991 | Sansone | 364/510 |
| 5,098,076 | 3/1992 | Kelsey | 270/54 |
| 5,102,110 | 4/1992 | Reynolds | 270/1.1 |
| 5,105,283 | 4/1992 | Forest et al. | 358/401 |
| 5,112,179 | 5/1992 | Chan et al. | 412/1 |
| 5,114,128 | 5/1992 | Harris, Jr. et al. | 270/11 |
| 5,119,306 | 6/1992 | Metelits | 364/464.16 |
| 5,136,316 | 8/1992 | Punater et al. | 346/153.1 |
| 5,142,667 | 8/1992 | Dimperio et al. | 395/111 |
| 5,143,362 | 9/1992 | Doane et al. | 270/1.1 |
| 5,144,562 | 9/1992 | Stikkelorum et al. | 364/478 |
| 5,177,877 | 1/1993 | Duchesne et al. | 34/51 |
| 5,178,063 | 1/1993 | Wolfberg et al. | 101/76 |
| 5,194,899 | 3/1993 | Buchanan | 355/244 |
| 5,200,903 | 4/1993 | Gilham | 364/478.07 |
| 5,210,824 | 5/1993 | Putz | 395/785 |
| 5,220,770 | 6/1993 | Szewczyk et al. | 53/493 |
| 5,245,701 | 9/1993 | Matsumoto | 345/429 |
| 5,267,821 | 12/1993 | Bodart et al. | 412/11 |
| 5,271,065 | 12/1993 | Rourke et al. | 382/1 |
| 5,274,567 | 12/1993 | Kallin et al. | 364/478 |
| 5,274,757 | 12/1993 | Miyoski et al. | 707/515 |
| 5,280,895 | 1/1994 | Meier | 270/58 |
| 5,287,976 | 2/1994 | Mayer et al. | 209/547 |
| 5,326,209 | 7/1994 | Duke | 412/1 |
| 5,337,258 | 8/1994 | Dennis | 364/551.01 |
| 5,377,120 | 12/1994 | Humes et al. | 364/478.12 |
| 5,398,289 | 3/1995 | Rourke et al. | 382/100 |
| 5,446,667 | 8/1995 | Oh | 364/464.16 |
| 5,587,799 | 12/1996 | Kawamura | 358/296 |
| B1 4,968,993 | 7/1993 | Wolfberg et al. | 346/160 |

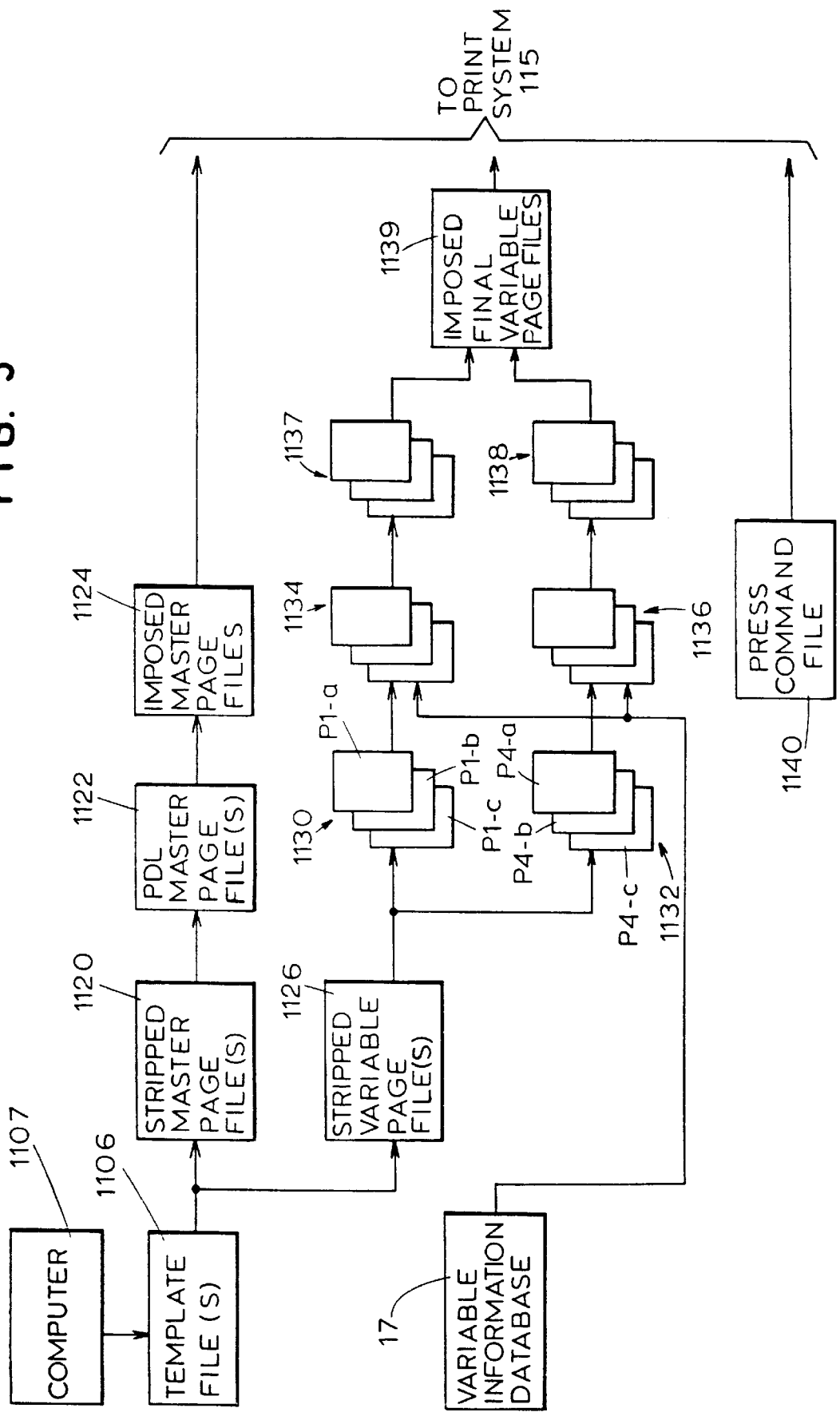

CO-MAILING OF DIVERSE PUBLICATIONS USING AN ELECTRONIC PRESS

CROSS REFERENCE TO RELATED APPLICATION

The present application comprises a continuation-in-part of U.S. application Ser. No. 08/478,397, pending Jan. 14, 1998 filed Jun. 7, 1995, entitled "Variable Imaging Using an Electronic Press," and owned by the assignee of the present application.

TECHNICAL FIELD

The present invention relates generally to printing systems and methods, and more particularly to the production of diverse publications within a single press run.

BACKGROUND ART

Large commercial printers often produce books (i.e., collated sets of printed signatures) on a publication-by-publication basis, i.e., the publications are produced one at a time without co-production of books of different publications. Often, a press run of a single publication is large enough to allow the printer to take advantage of postal discounts, which are generally available when certain specified counts or numbers of books are to be mailed to a particular carrier route or are to be sent to a particular sectional center facility (SCF), bulk mail center (BMC) or other postal facility.

Production processes and apparatus have been developed to permit books of diverse publications to be collected in a presorted sequence to allow greater postal discounts to be taken than would otherwise be available if the publications were not collectively presorted. For example, Mayer et al. U.S. Pat. No. 5,287,976 discloses a system for co-mailing the books of diverse publications including a co-mailing line which accepts preproduced and preaddressed books and which deposits the books in a sequence on a conveyor so that the books can be bundled in a fashion to obtain significant postal savings. While such a system can accomplish co-mailing, the system is by necessity complex. Also, in the event that one or more books are damaged or defectively produced during the collection process, there is only limited opportunity to economically replace the book with a different book and still obtain the desired postal discount. Further, the high cost and operation expense of the co-mailing system render it economical only under limited circumstances.

It would also be possible to co-produce diverse publications on a single conventional binding line so that the books are produced initially in the desired postal sequence. However, this would require the use of a large number of packer boxes to hold the required signatures, and quickly becomes impractical owing to the relatively large space required for and the downtime associated with the many packer boxes.

SUMMARY OF THE INVENTION

A system is capable of operating an electronic press to produce diverse publications in a sequence which allows postal discounts to be taken.

More particularly, according to one aspect of the present invention, a system for operating an electronic press to produce a plurality of diverse publications from data stored in associated publication databases wherein the data stored in each publication database are ordered in a certain sequence includes means for establishing a job database having the data from the publication databases stored therein whereby such data are ordered in a job sequence different than the certain sequences of the publication databases. Means are also provided for controlling the electronic press in accordance with the data in the job database and the job sequence.

Preferably, the data in the job database include postal information and the establishing means comprises means for sorting the data according to the postal information. Also preferably, the sorting means comprises means for comparing the postal information to sort the data according to postal sort order.

Still further, each publication comprises a number of books each to be sent to a recipient and the data in each database are preferably arranged as a series of records each including information to produce a book and comprising of a number of fields wherein one or more of the fields comprise postal address of a recipient.

In accordance with a further aspect of the present invention, a system for operating an electronic press to produce a plurality of diverse publications from records stored in associated separate publication databases wherein each publication includes at least one version of a number of books to be sent to recipients and each record includes a plurality of fields including a recipient address field comprises first means for establishing a job database, second means for establishing a sort table and means for loading the sort table with recipient address fields from the publication databases. Means are provided for comparing data in the recipient address fields of the sort table to determine a postal sort order for records from the publication databases. Means are also provided for sorting the records from the publication databases in the job database such that the records are ordered in the postal sort order as well as means for controlling the electronic press in accordance with the records in the job database and the postal sort order.

In accordance with a further aspect of the present invention, a method of controlling an electronic press in accordance with first and second publication databases wherein each database includes data ordered in an associated publication sequence and defining books of an associated publication includes the steps of assembling the data from the first and second publication databases into a job database wherein the data are ordered in the job database in a job sequence different than the publication sequences and operating the electronic press to produce books in accordance with the job sequence.

The present invention permits economical co-mailing of diverse publications, even when short run counts are involved. Further, no complex and costly apparatus for assembling finished books into a mailing sequence is required.

BRIEF DESCRIPTION OF THE DRAWINGS

FIG. 5 is a generalized diagram of the steps implemented by the method of the present invention;

DESCRIPTION OF THE PREFERRED EMBODIMENTS

Figure 1:
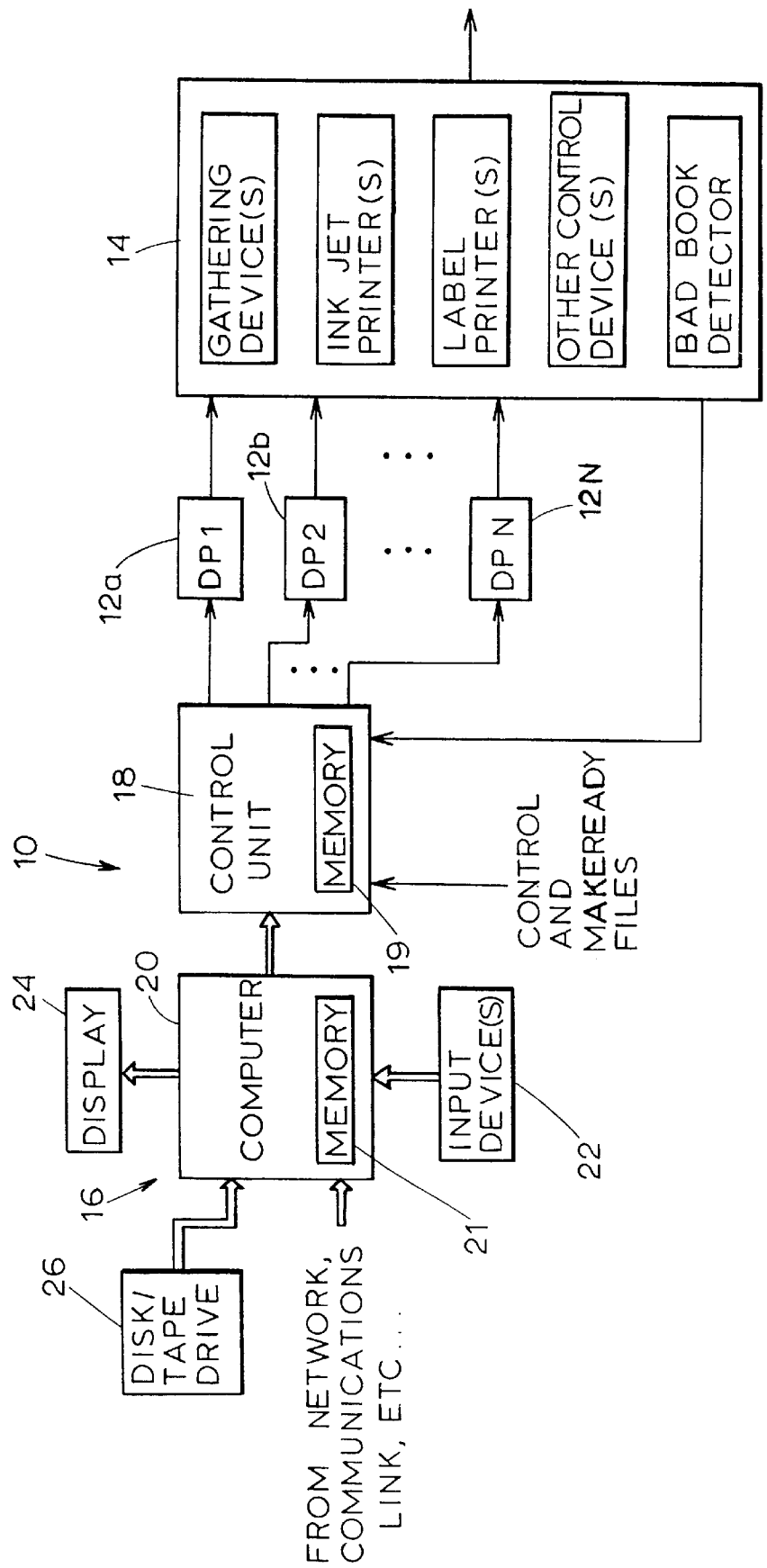
FIG. 1 comprises a block diagram of a press system for producing books including a job collator and a control unit according to the present invention.

Referring now to FIG. 1, a reproduction system 10 provides data to one or more electronic press systems 12a, 12b, . . . 12N to cause the press systems to produce books in a particular sequence. If desired or necessary, the books may be supplied to finishing apparatus 14 which processes the books as required for delivery to individual recipients. The finishing apparatus 14 may comprise gathering and other control devices, for example, folders, stitchers, gluers, book wrapping devices or the like, as well as ink jet and label printers.

The reproduction system 10 includes a job collator 16 that supplies a job database 17 (FIG. 5) to a control unit 18 having a memory 19 together with page template files in electronic format specifying pages to be printed by the electronic press systems 12a–12N. In the preferred embodiment, the job database 17 includes data specifying the production of a plurality of diverse publications in postal sort order, i.e., in a production sequence which allows at least some postal discounts to be taken. Other data are present in the job database as noted in greater detail hereinafter. The term "diverse publications" means different book titles, such as *Popular Science, Field and Stream*, a manufacturer's or marketer's catalog, or the like. Each publication or title may in turn include one or more versions all of which may have similar general content but which may differ from one another in certain respects. These differences may include personalization in the form of messages and/or may comprise pages which differ from version to version. Other differences may be present between versions of the same publication, as should be evident to one of ordinary skill in the art.

As seen in FIG. 1, the job collator 16 may comprise a personal computer or other type of computer 20. The computer 20 includes a memory 21 and is responsive to commands entered by one or more input devices 22, such as a keyboard, a mouse, a light pen or the like, and is capable of providing visual indications via a display 24 to a user.

The computer 20 further receives data in the form of a plurality of publication databases wherein each publication database relates to books of a single publication to be produced. If desired, multiple databases may be provided for each publication or a single database may relate to multiple versions of a publication. The databases may be provided by a data reader, for example, a disk or tape drive 26, and/or the data may be provided from a remote location, for example over a network, a communications link via modem, or the like.

Figure 2:
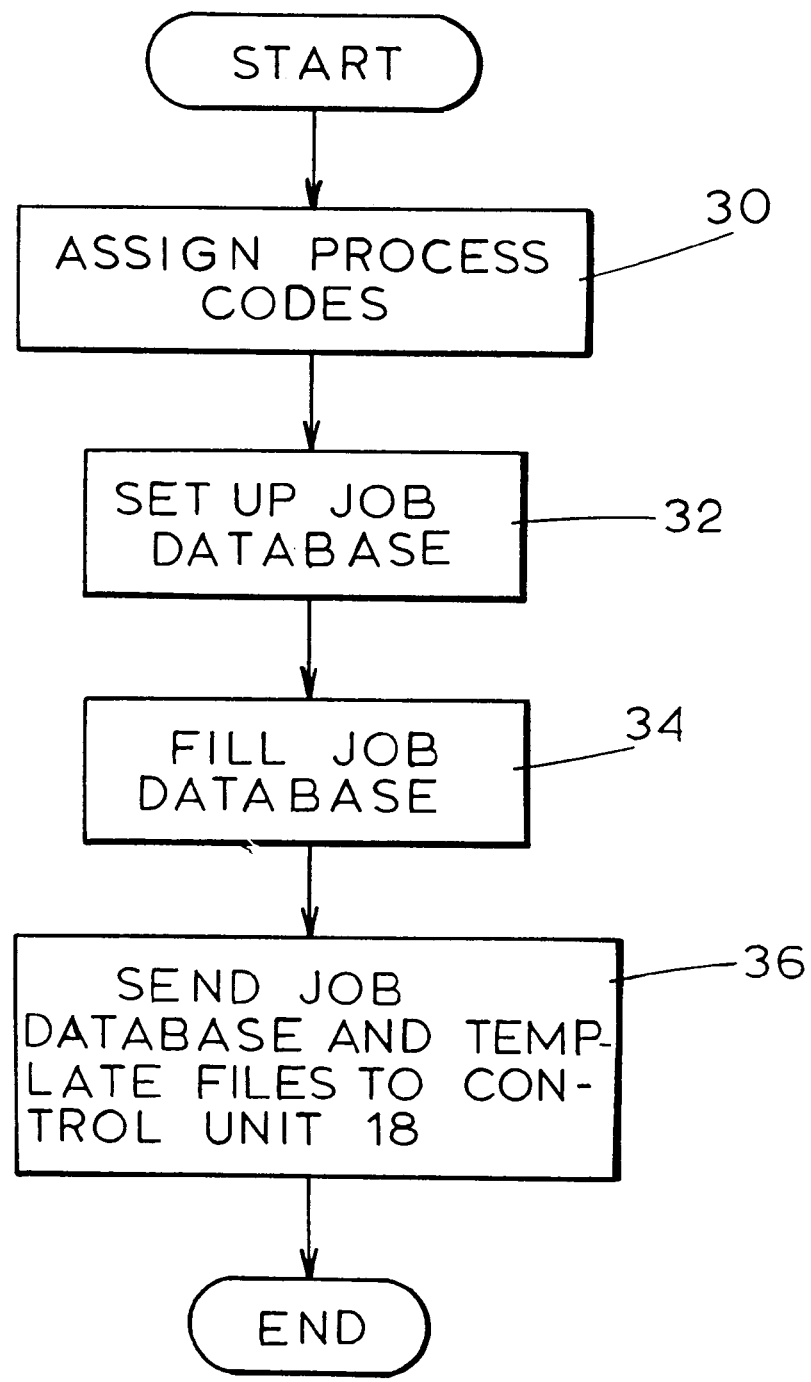
FIG. 2 comprises a block diagram illustrating the sequence of steps undertaken by the job collator of FIG. 1.

FIG. 2 generally illustrates the sequence of operations undertaken by the computer 20. Each publication database, and the resulting job database 17 derived therefrom, includes a number of records, each of which includes a plurality of fields arranged under field headers or identifiers. In a first, simplified example, assume that four publications are to be co-mailed to the same carrier route and that the publication databases (entitled Publication 1, Publication 2, Publication 3 and Publication 4) include data as follows (in the following example, city, state, zip code, carrier route data and other data are not shown):

| Publication 1 | | |
|---|---|---|
| Name | Address Line | Version |
| Andrew Jay | 2116 Grove | 01 |
| Tim Dreyer | 128 Easy Street | 01 |
| Diane Miller | 1016 Grove | 02 |

| Publication 2 | |
|---|---|
| Name | Address Line |
| Carol Nichols | 185 Park Place |
| Joe Williams | 234 Easy Street |
| Lynda Drew | 1214 Grove |
| Matthew Warmus | 123 Easy Street |

| Publication 3 | | |
|---|---|---|
| Name | Address Line | Percent Off |
| Jennifer Dreyer | 129 Easy Street | 14 |
| Paul White | 1647 James | 10 |

| Publication 4 | | |
|---|---|---|
| Name | Address Line | Version |
| Mary Terzic | 130 Easy Street | 01 |
| Donna Slamecka | 1916 Grove | 02 |

From the foregoing, it can be seen that the publication databases can be different in that each may have a different number of fields than the others and that there is not necessarily a one-to-one correspondence of field headers from publication database to publication database. Thus, for example, the databases for Publication 1 and Publication 4 include field headings "Name," "Address Line" and "Version" while Publication 2 includes only the field headers "Name" and "Address Line." Publication 3, on the other hand, includes field headers "Name," "Address Line" and "Percent Off." The data in the fields arranged under the field headers "Name" and "Address Line" identify recipients and their addresses, as should be evident. The data under the "Version" field header identify the particular version of the publication to be sent to the recipient identified in the same record. The data in the "Percent Off" field represent information to be printed at an appropriate point in the publication informing the recipient of a discount level for such recipient (for example, when the publication comprises a catalog and the recipient is to be notified that she or he is entitled to a discount off listed prices).

Of course, the number of records in each publication database and the number and identity of field headers as well as the data arranged thereunder may vary from those shown above.

The sequence illustrated in FIG. 2 begins at a block 30 where process codes are assigned. As noted in greater detail hereinafter, each process code uniquely identifies a book version. A job database 17 is then established at a block 32 by loading an empty database with all of the different field headers in the publication databases. Thereafter, the job database 17 is filled (block 34) with the data in the various publication databases. The resulting job database 17 and the page files are then sent to the control unit 18 at a block 36, following which the process is terminated. As noted in greater detail hereinafter, the control unit 18 includes apparatus responsive to the job database 17 and the page template files to cause one or more of the electronic press systems 12a–12N to create the printed pages.

Figure 3A:
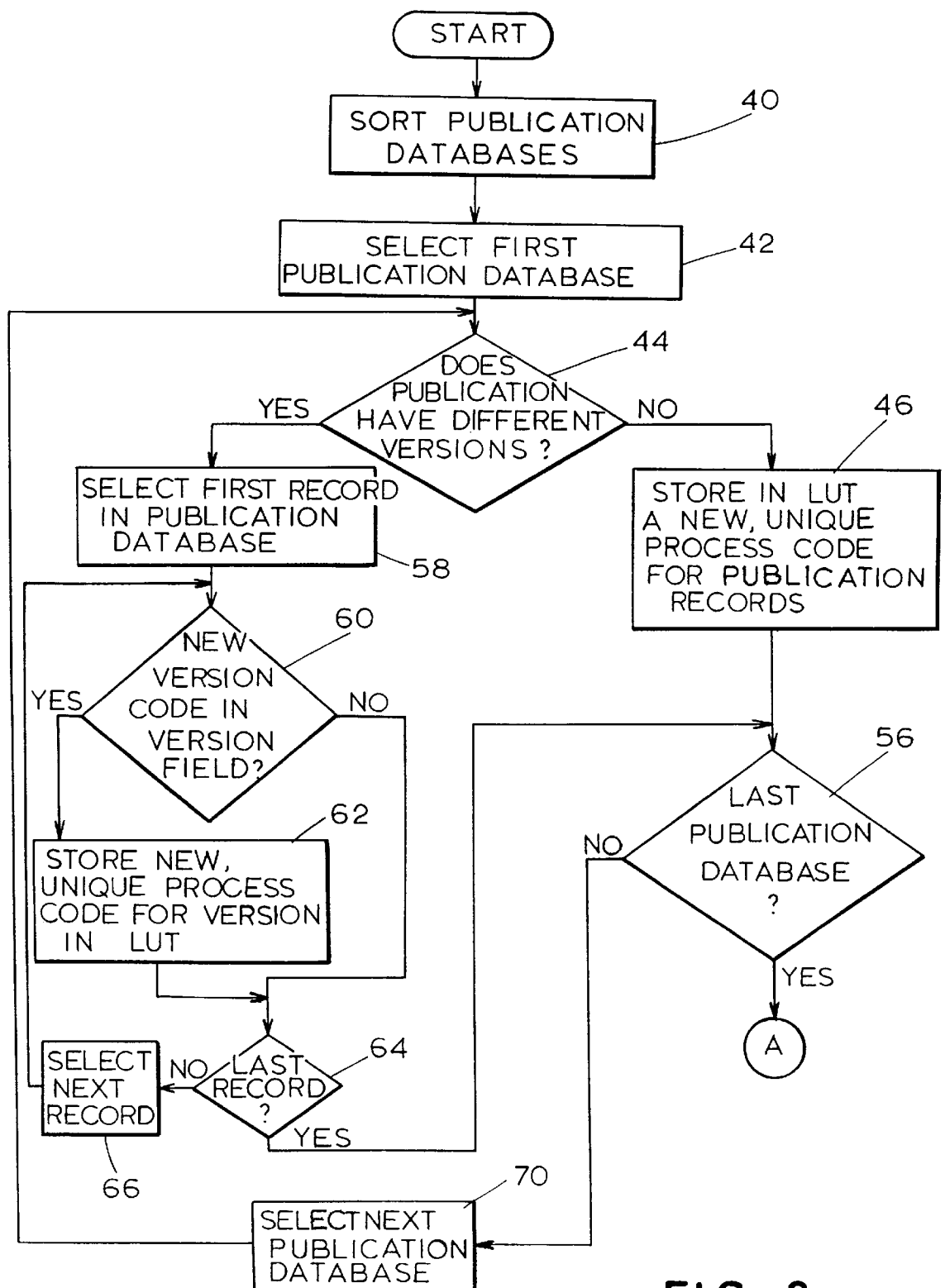
FIGS. 3a–3d, when joined along the similarly lettered lines, together comprise a flowchart of programming executed by the job collator to implement the steps of FIG. 2.

Referring now to FIG. 3a, the programming executed by the computer 20 begins at a block 40 which sorts each publication database in postal sort order. The term "postal sort order" is intended to mean that each database is sorted according to carrier route walk sequence as determined by the U.S. Postal Service. Alternatively, any other order related to postal delivery may be used. In the preferred embodiment, this sortation comprises an actual (i.e., physical) reordering of the records in the database. Alternatively, the sortation may comprise adding a field to the database identifying such order. Software programs for sorting according to postal sort order are well known to one of ordinary skill in the art and may comprise, for example, Obulis Mailer marketed by Sator Software of Seattle, Wash., or any other suitable program. At this point the four databases of the foregoing example have the following content:

| Publication 1 | | |
|---|---|---|
| Name | Address Line | Version |
| Tim Dreyer | 128 Easy Street | 01 |
| Diane Miller | 1016 Grove | 02 |
| Andrew Jay | 2116 Grove | 01 |

| Publication 2 | |
|---|---|
| Name | Address Line |
| Matthew Warmus | 123 Easy Street |
| Joe Williams | 234 Easy Street |
| Carol Nichols | 185 Park Place |
| Lynda Drew | 1214 Grove |

| Publication 3 | | |
|---|---|---|
| Name | Address Line | Percent Off |
| Paul White | 1647 James | 10 |
| Jennifer Dreyer | 129 Easy Street | 14 |

| Publication 4 | | |
|---|---|---|
| Name | Address Line | Version |
| Mary Terzic | 130 Easy Street | 01 |
| Donna Slamecka | 1916 Grove | 02 |

Following the block 40, a block 42 selects the first publication database, for example, the Publication 1 database identified in the table above. A block 44 then checks to determine whether the publication has different versions, for example, by determining whether the database includes a "Version" field header. If the publication does not have different versions, a block 46 selects a unique process code and stores such code in a look-up table (LUT) in the memory 21 for all of the records of the publication database. Control then passes to a block 56.

If the block 44 determines that the publication includes different versions, a block 58 selects the first record in the publication database and a block 60 checks to determine whether the code represented by the data in the "Version" field has been encountered previously in connection with this publication. During a first pass through the program, a determination is made that this is a new version code and hence a block 62 stores in the LUT a new unique process code corresponding to the version code. A block 64 then checks to determine whether the record is the last in the publication database and, if not, the next record is selected by a block 66 and control returns to the block 60. Eventually, as records are sequentially selected, the block 60 will determine that a new version code has not been encountered in the "Version" field. When this occurs, control bypasses the block 62 and proceeds directly to the block 64.

Once the last record has been considered, control passes to the block 56 which checks to determine whether the last publication database has been selected. If this is not the case, a block 70 selects the next publication database and control returns to the blocks 44–66.

Figure 3B:
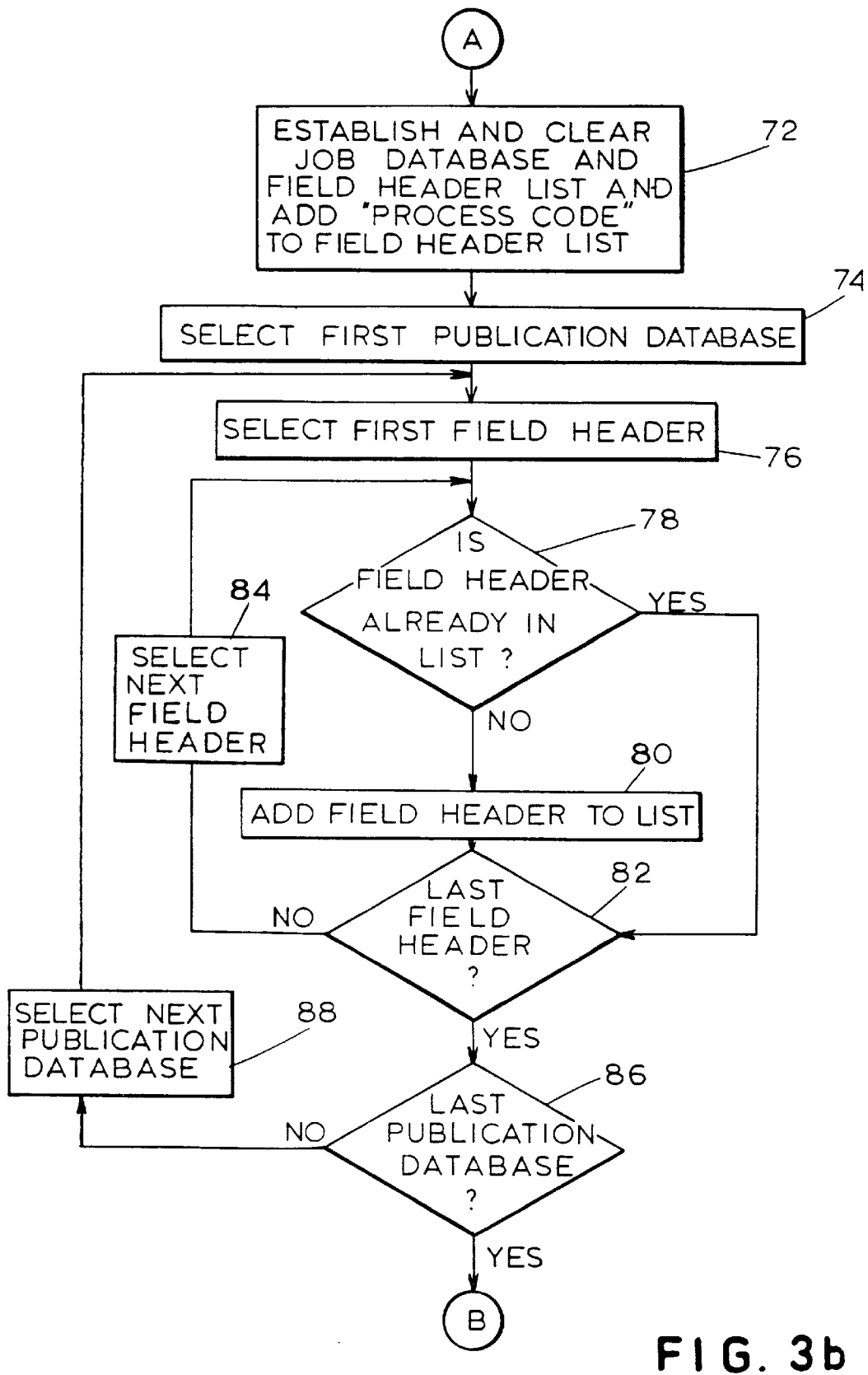

Once the block 56 determines that the last publication database has been selected, control passes to a block 72, FIG. 3b. At this point the LUT stores a process code for each record in the publication databases uniquely identifying the version of the book represented by the record or, in the case where the books of a publication are all the same version, a single process code for all of the books of such publication database.

The block 72 establishes a job database 17 in the memory 21 of the computer 20. At this point, the job database 17 has no data stored in it. In addition, a field header list is also established in the memory 21 and a header "Process Code" is added to the list.

A block 74 then selects the first publication database and a block 76 selects a first field header in the publication database selected by the block 74. Thereafter, a block 78 checks to determine whether the selected field header has already been stored in the field header list. If this is not the case, a block 80 adds such header to the list. Following the block 80, or following the block 78 if the field header is already in the list, a block 82 checks to determine whether the last field header has been selected and, if this is not the case, a block 84 selects the next field header in the publication database. Control then returns to the blocks 78–82. In this fashion, each of the field headers is selected from the publication database and added to the field header list, if it has not already been added thereto.

Figure 3C:
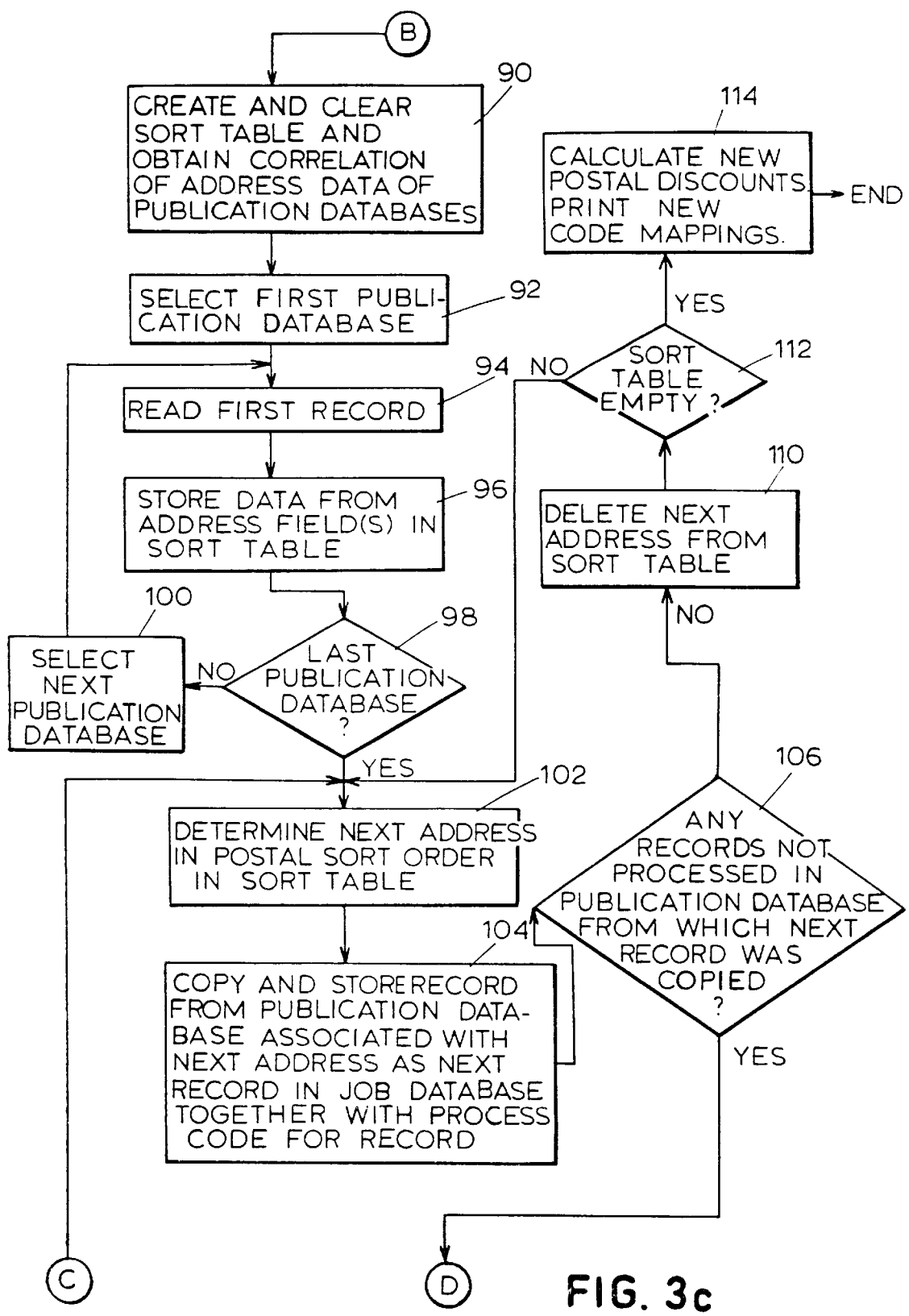

Following the block 82, a block 86 determines whether the last publication database has been selected. If not, a block 88 selects the next publication database and control returns to the block 76 where the first field header in the next publication database is selected. Control then remains with the blocks 78–84 until all of the field headers of the selected publication database have been added to the field header list. Once all of the publication databases have been selected, control passes to a block 90, FIG. 3c.

The block 90 creates an empty sort table in the memory 21 and obtains an indication from an operator correlating the fields of the various databases containing address data so that such data can later be analyzed. A block 92 then selects the first publication database. A series of blocks 94–100 thereafter retrieve the data in the "Address Line" field of the first record of the first database as well as the corresponding address data (as indicated by the operator) in the first records of the remaining databases and store such data as separate entries in the sort table. Once the sort table has been so filled, a block 102 determines which address in the sort table is the first according to postal sort order and designates same as the "next address." The function of the block 102 may be accomplished by accessing a database known as C.A.S.S. "(Coding Accuracy Software System)" available from the U.S. Postal Service identifying addresses in postal sort order. The sortation should take into account various U.S. Postal Service requirements concerning bundling, weight, tray size, bundle/bag/tray tag requirements and the like. The record from the publication database associated with the "next address" (hereinafter designated the "next record") and the process code for the record are then stored by a block 104 in the first record position in the job database 17. Thus, as seen in the table above, the record associated with the address "123 Easy Street" may be selected and stored together with the recipient name "Matthew Warmus" in the job database 17 together with the process code "03" by the programming of FIG. 3*a*.

Figure 3D:
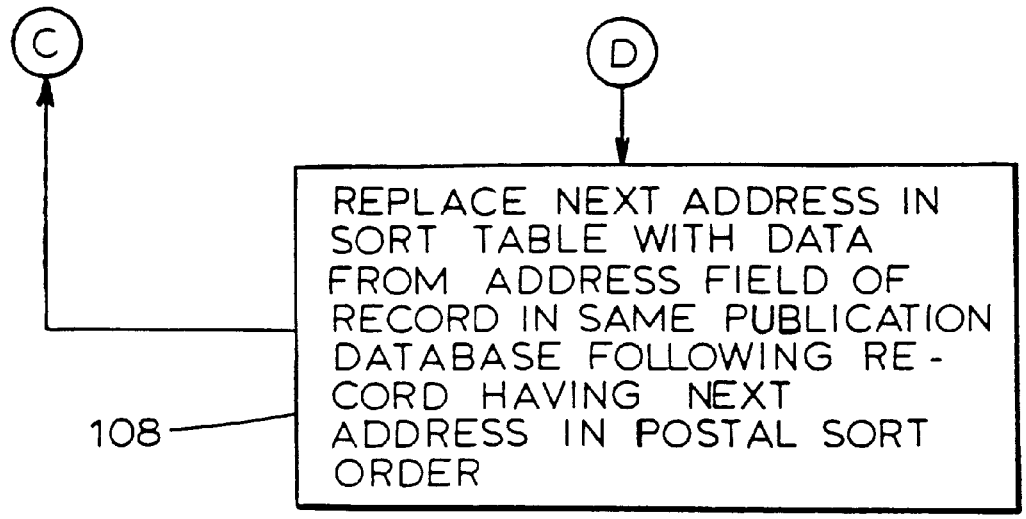

Following the block 104, a block 106 checks to determine whether there are any records in the publication database from which the "next record" was copied and which have not been considered using the sort table. Thus, in the foregoing example, the block 106 checks to determine whether there are any other records in the Publication 2 database which have not been sorted. If this is the case (as it is in the example), a block 108 (FIG. 3*d*) replaces the "next address" in the sort table with the address data of the next record in the same publication database following the "next record." With reference to the example noted above, the "next address" of "123 Easy Street" is replaced by the address data of the second record in the Publication 2 database (i.e., "234 Easy Street"). Control then returns to the blocks 102–106. As processing continues in the loop consisting of the blocks 102–108, new "next address" determinations will be made and replaced by other address data in the publication databases. Eventually, the end of a publication database will be reached, at which point a block 110 deletes the "next address" from the sort table. Thus, in the foregoing example, it may occur that the second record in the Publication 3 database becomes the "next address" in the sort table, in which case the block 106 passes control to the block 110 to delete the data representing the address "129 Easy Street" from the sort table. A block 112 then checks to determine whether the sort table is empty and, if not, a new "next address" in the sort table is determined. Eventually, the last records of the databases will be determined as the "next address" and will be deleted from the sort table until the sort table is empty. At such point, the job database 17 is constituted as follows:

| Name | Address Line | Process Code | Percent Off | Version |
|---|---|---|---|---|
| Matthew Warmus | 123 Easy Street | 03 | | |
| Tim Dreyer | 128 Easy Street | 01 | | 01 |
| Jennifer Dreyer | 129 Easy Street | 04 | 15 | |
| Mary Terzic | 130 Easy Street | 05 | | 01 |
| Joe Williams | 234 Easy Street | 03 | | |
| Carol Nichols | 185 Park Place | 03 | | |
| Paul White | 1647 James | 04 | 10 | |
| Diane Miller | 1016 Grove | 02 | | 02 |
| Lynda Drew | 1214 Grove | 03 | | |
| Donna Slamecka | 1916 Grove | 06 | | 02 |
| Andrew Jay | 2116 Grove | 01 | | 01 |

Once the block 112 determines that the sort table is empty, a block 114 calculates new postal discounts based upon the content of the job database 17. This may be accomplished using the C.A.S.S. database noted above. In addition, the contents of the LUT correlating the process codes to the publications and the versions are printed for an operator.

If desired, the functions of the blocks 90–114 can be undertaken by any suitable postal sortation software, such as that noted above, modified to create process codes from the data in the LUT and to append the process codes to the records.

Following the block 114, control passes to the block 36 of FIG. 2 where the job database 17 and the template files are transmitted to the control unit 18. The control unit 18 creates one or more master and variable page files in, for example, a page description language (PDL) such as Postscript® (PostScript® is a trademark of Adobe Systems, Inc. for its page description language) representing pages to be produced. In addition, as noted in greater detail hereinafter, a press command file is developed which specifies the manner in which data contained within the master and variable page files are to be merged to produce printed pages. The format of the press command file is specified by Barco Graphics of Gent, Belgium and is particularly suited for control of a DCP-1 digital color press manufactured by Xeikon of Mortsel, Belgium. It should be noted that the apparatus and method of the present invention are not limited to use with a particular type of demand printer or a particular system for controlling such a printer, inasmuch as the invention can be adapted for use with any type of printer or control whether located locally or remotely.

Figure 4:
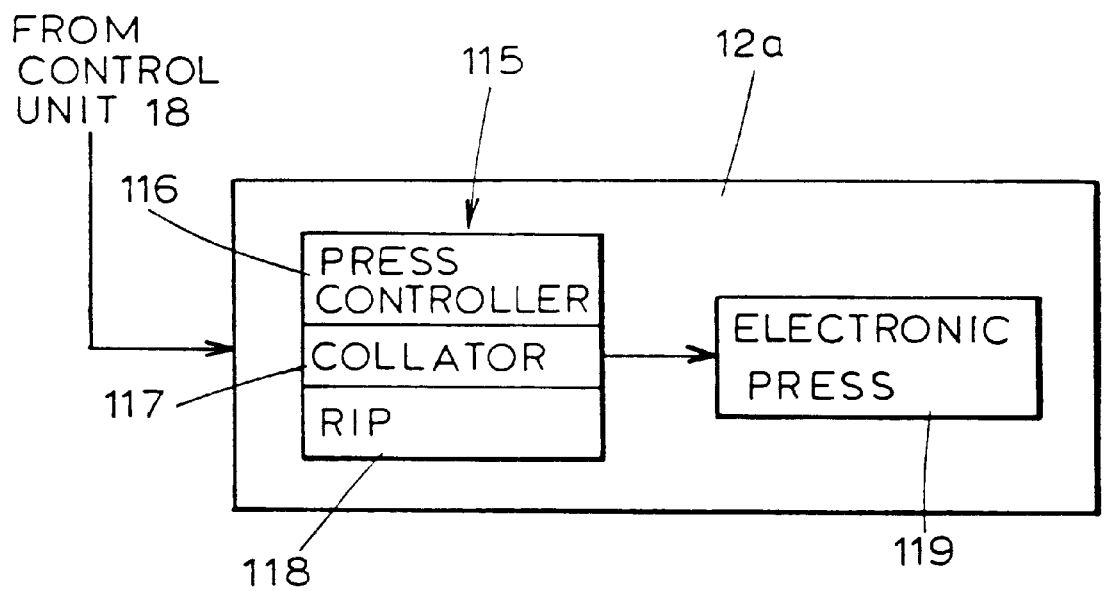
FIG. 4 is a block diagram illustrating one of the demand printing systems of FIG. 3 in greater detail.

FIG. 4 illustrates one of the electronic press systems 12*a*, it being understood that the remaining electronic press systems 12*b*–12N are identical thereto. The master and variable page files and the press command file are converted by a print system 115 including a press controller 116, a collator 117 and a raster image processor (RIP) 118 into bitmaps which may be stored in a memory.

A collator is an electronic device for storing raster image processed ("ripped") files (i.e., bitmap files) and delivering selected files to a digital electronic press 119 in real time, such that the digital press can run at full speed while processing and printing unique page data for each book produced on the press. The RIP 118 converts the page files to bitmap format or any other format, such as a symbolic printer control language. The collator 117 includes memory in the form of mass storage drives and physical memory and collates the bitmap page files. If desired, the collator 117 and/or RIP 118 may comprise a part of the press controller 116. The controller 116 instructs the collator 117 to send page files to the electronic press 119. The print system 115 may comprise the PrintStreamer system, manufactured and marketed by Barco Graphics of Belgium, while the demand printer 119 may comprise the Xeikon DCP-1 digital color press noted above. It should be noted that a different print system and/or demand printer may alternatively be used, such as the Indigo printer manufactured by Indigo of NV, of Maastricht, Netherlands if desired.

Because the time required to process files using the RIP 118 can be great, it may prove advantageous to provide the print system 115 with one or more removable storage media devices and/or network devices so that the ripped file data can be stored. In this fashion, files to be used at different points in time can be ripped once and recalled as necessary without the need to re-rip the file data, potentially resulting in time savings, facilitating transfer of jobs from press-to-press and permitting exact backup of job results for quality assurance purposes.

The stored bitmap files are used to control the electronic press 119 and/or any other type of display device, such as a laser printer, a CRT, an LCD display or the like so that the device displays pages having fixed information (i.e., information that does not vary from book to book of the same publication version) and variable information (i.e., information which typically varies from book to book of a publication). Alternatively, the master and variable page files may be premerged to create a plurality of combined files each representing a page to be reproduced with master and variable information. The combined files can then be sent to any type of printer or other display device, whether local or remote. Also, the combined files can be converted to a suitable format (e.g., Acrobat® PDF format) and transmitted to a remote location using a facsimile machine, e-mail or other transmission medium, if desired.

During a finishing step, the assembled books are bound and trimmed and, if desired, further customization can be effected.

It should be noted that the control unit 18 may operate a fax machine (not shown) and/or may communicate with other remote devices to send properly converted combined files, as desired and as noted above. The combined files may be printed or may alternatively be reproducible in a different medium and/or may comprise a non-static image or other information, i.e., movies or audio.

Further, the finishing apparatus 66 may include one or more detectors to sense when a defective book is produced. The control unit 18 may be responsive to the output of such detector(s) to reorder a defective book at an appropriate point in the production sequence thereof so that advantage can be taken of postal discounts, if possible.

Figure 6A:
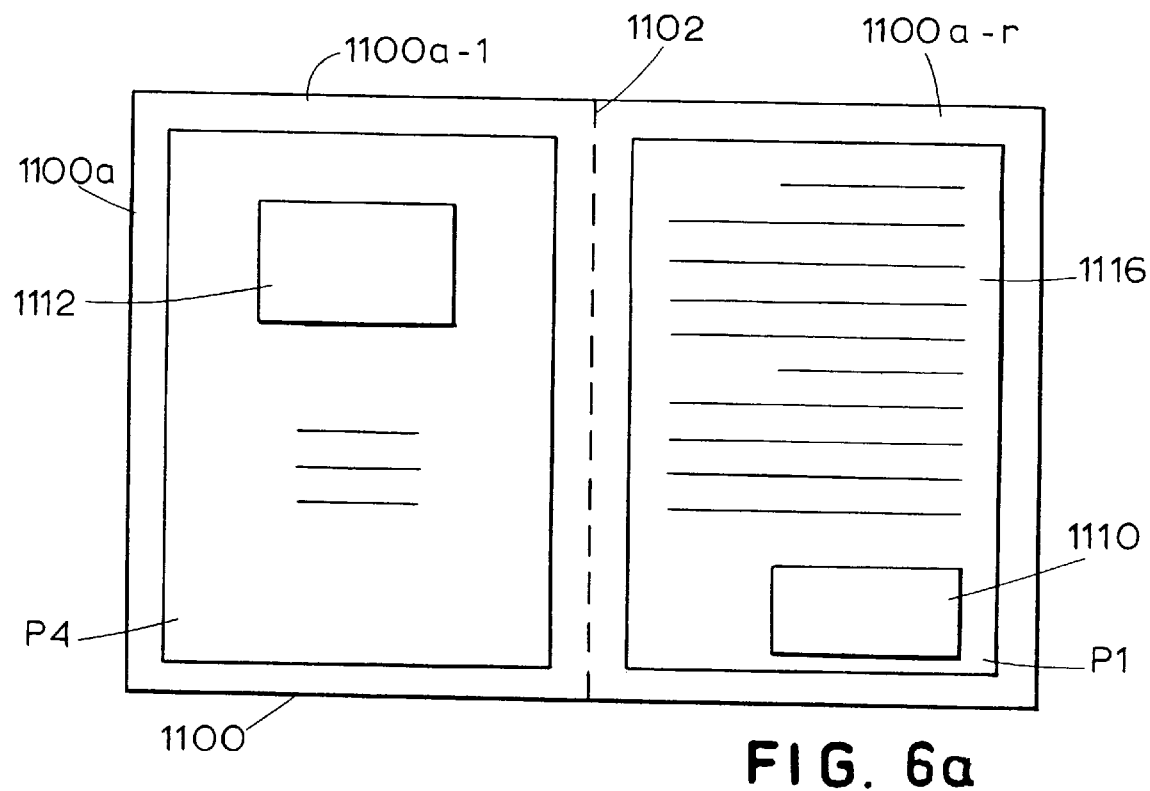
FIGS. 6a and 6b are elevational views of a sample book that may be produced by the present invention.
Figure 6B:
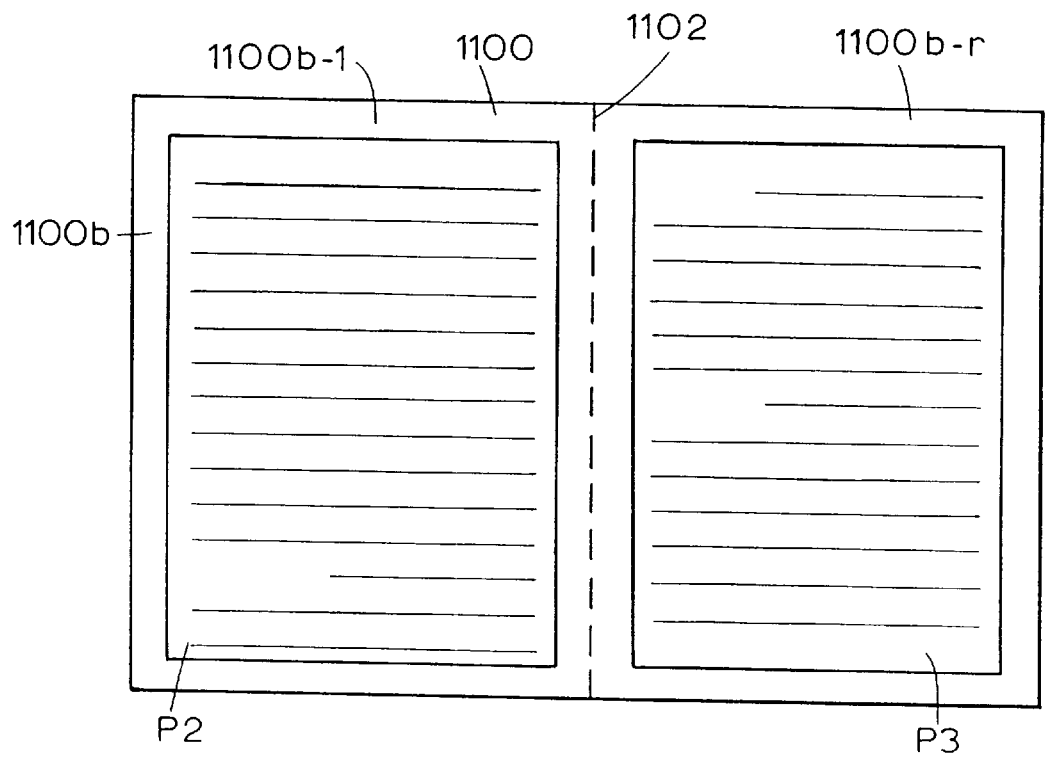

FIG. 5 illustrates in diagrammatic generalized form the operation of the control unit 18. As an example, it will be assumed that the electronic press system 12*a* will be operated to produce three four-page books in the form of a brochure in duplex format. That is, as seen in FIGS. 6*a* and 6*b*, a first sheet of paper 1100 is to be printed on a first side 1100*a* with printed pages P1, P4 while a second side 1100*b* of the sheet 1100 is to be printed with pages P2, P3. In addition, pages P1–P4 are to be imposed such that the page P1 is placed on a right-hand portion 1100*a–r* of the side 1100*a* while the page P4 is placed on a left-hand portion 1100*a*-1 of the side 1100*a*. Further, the page P2 is to be placed on a left-hand portion 1100*b*-1 of the side 1100*b* while the page P3 is to be placed on a right-hand portion 1100*b–r* of the side 1100*b*. In this fashion, when the sheet of paper 1100 is folded along a fold line 1102 with the pages P1 and P4 on the outside, the pages P1–P4 will appear in sequence. Because each book to be produced in this example comprises only a single sheet of folded paper, the imposition process need not take into account shingling or bottling effects, although it should be noted that such effects may have to be taken into account when more than one sheet of paper is assembled with other sheets of paper to produce a book and/or when more than two pages are to be printed on a single side of a sheet of paper and thereafter assembled with other pages to create a book.

In addition to the foregoing, in this example, assume that the three books to be produced include variable and fixed information on the first and last pages of each book and fixed information only on the remaining pages. For example, the page P1 may include variable information in the form of a personalized message, a variable image, or the like in an area 1110 whereas the page P4 may include other variable information in an area 1112, for example, postal information for mailing the brochure to an addressee. Corresponding front and back pages of the remaining books may include different variable information. The remaining printed information on pages P1–P4 is to be identical to the printed information on corresponding pages of the other two books.

Figure 7A:
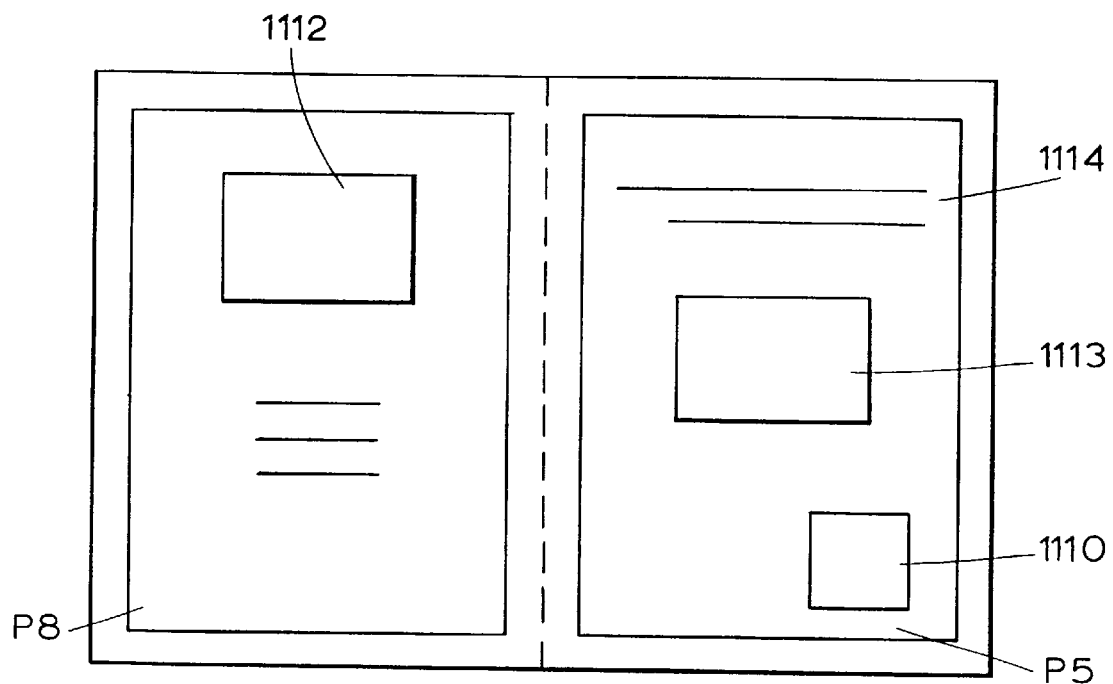
FIGS. 7a, 7b, 8a and 8b are elevational views of other sample books that may be produced by the present invention.
Figure 7B:
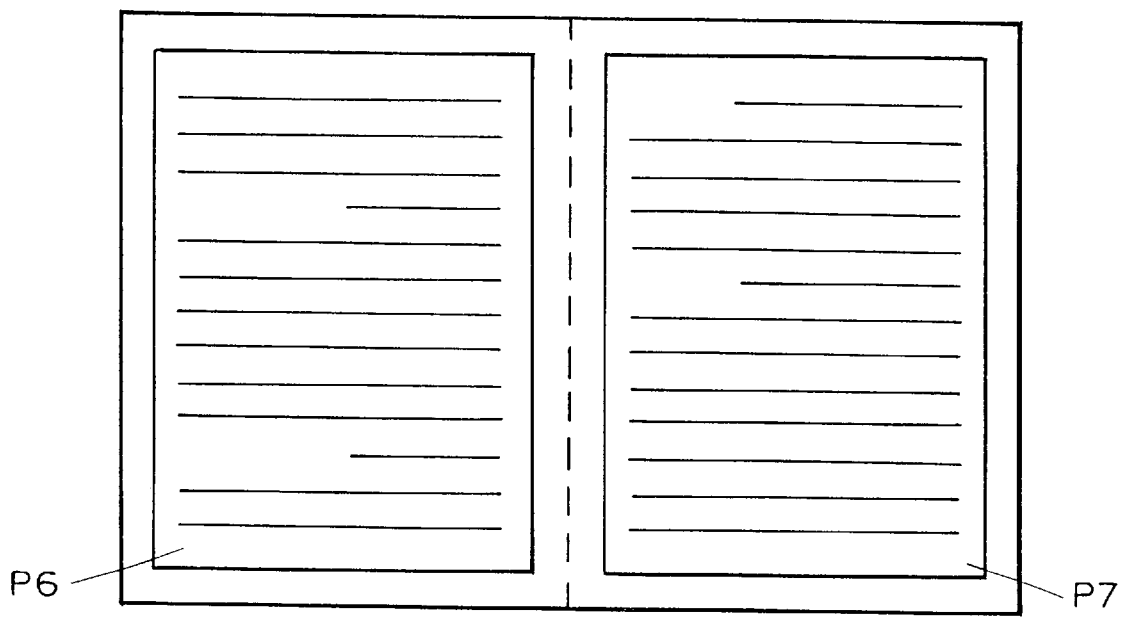

Of course, as noted previously, the control unit 18 can operate the press systems 12*a*–12N to produce different versions and/or publications in the same production or press run. For example, the book versions of FIGS. 7*a*, 7*b* and 8*a*, 8*b* may be produced together with the book version of FIGS. 6*a* and 6*b* in the same production run whether or not the books are of the same publication. The book version example of FIGS. 7*a* and 7*b* includes pages P5–P8 to be reproduced a number of times to produce individual books. The book version of FIGS. 7*a* and 7*b* is identical to the book version of FIGS. 6*a* and 6*b* except that an additional area 1113 is provided on the page P5 for placement of variable information, in addition to the areas 1110 and 1112. Because of the addition of the area 1113, the remaining master information appearing in an area 1114 differs from master information appearing in an area 1116 of the page P1 of FIG. 6*a*.

Figure 8A:
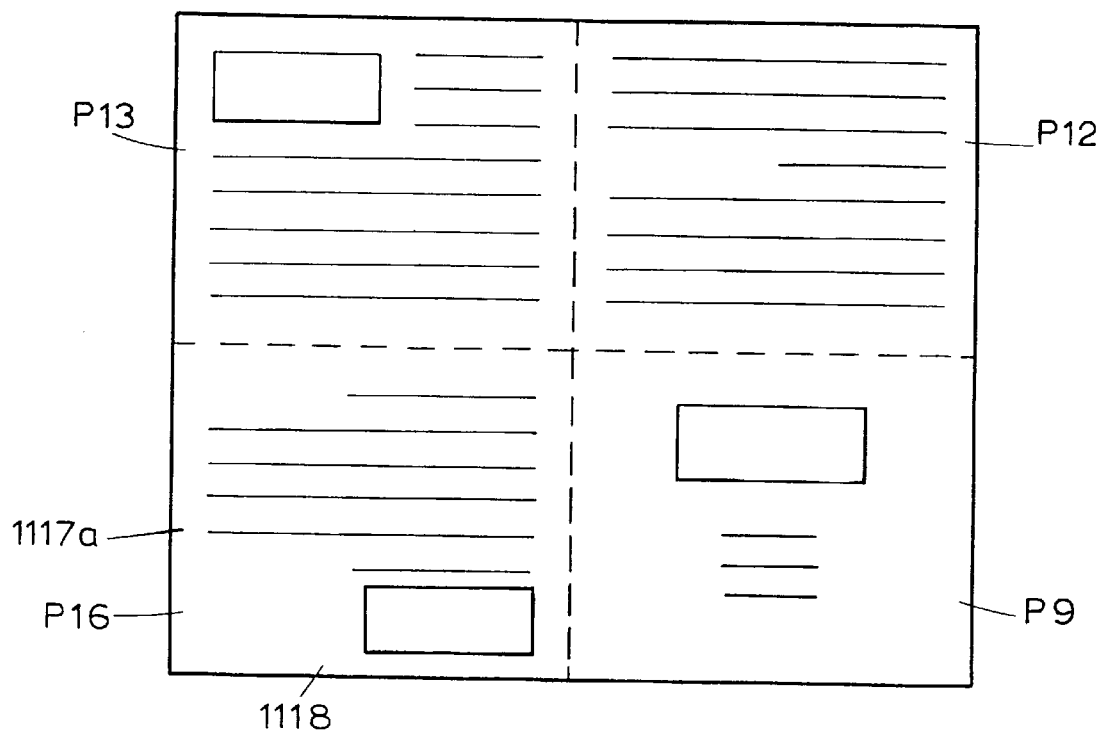
Figure 8B:
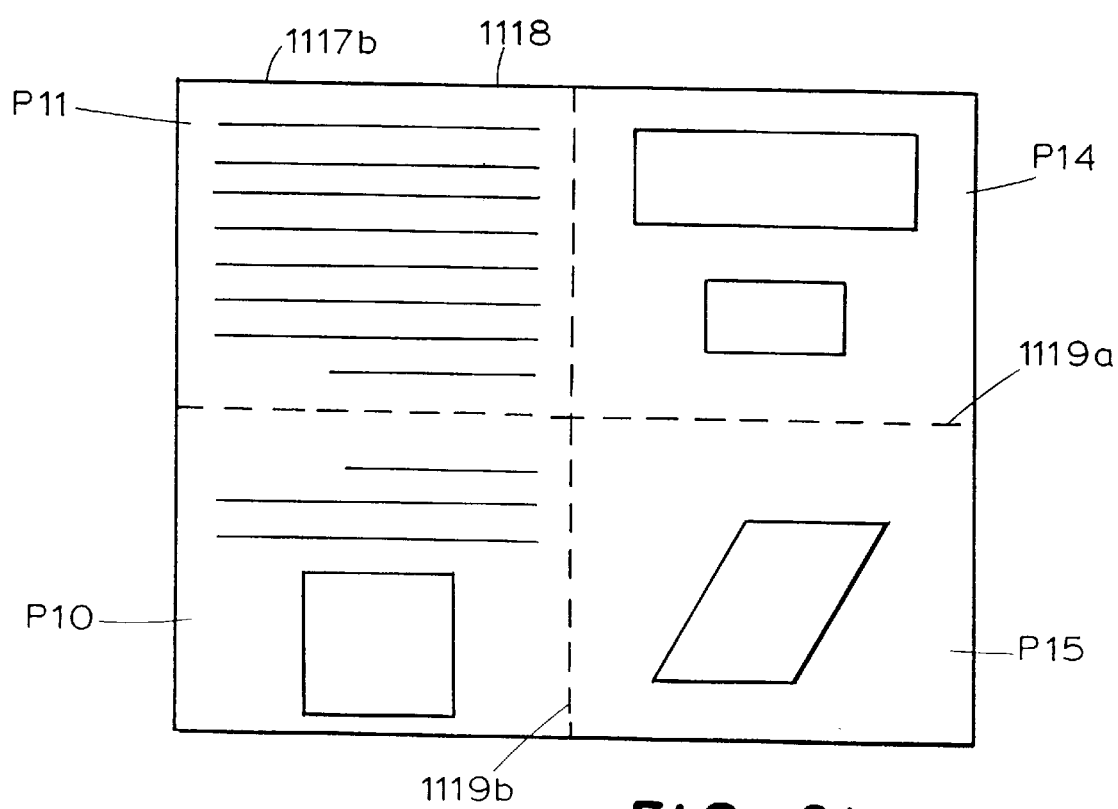

The example of FIGS. 8*a* and 8*b* differs from the examples of FIGS. 6*a*, 6*b* and 7*a*, 7*b* not only in terms of content of master and variable information, but also number of pages and page size. Specifically, eight pages P9–P16 are printed wherein the pages P9, P12, P13 and P16 are located on a first side 1117*a* of a sheet of paper 1118 and the remaining pages P10, P11, P14 and P15 are located on a second side 1117*b* of the sheet 1118. In addition, the pages P11–P14 are printed upside down relative to the remaining pages so that, when the sheet 1118 is folded first along a fold line 1119*a* and then along a fold line 1119*b*, the resulting pages P9–P16 appear in order. Thereafter, the folded sheet 1118 is trimmed to separate the pages P9–P16. As should be evident, the pages P9–P16 are one-half the size of the pages P1–P8, and further include different master and variable information thereon.

It should be noted that books assembled from multiple printed "forms" (defined in greater detail hereinafter) may alternatively or in addition be produced, if desired.

Referring again to FIG. 5, one or more template files 1106 are developed by a publisher using a personal computer 1107 specifying the content (including appearance) of fixed information and the positioning of all information (i.e., fixed and variable) on the different books or book versions. The job database 17 specifies the content of variable information to be placed in variable information areas, for example, the areas 1110, 1112 on the pages P1, P4, respectively, of FIGS. 6*a* and 6*b*. The job database 17 further includes control information, as noted in greater detail hereinafter.

Specifically, the template files 1106 define template pages wherein each template page includes data representing any fixed information to be reproduced on corresponding pages of the books or book versions and area data representing any area(s) on the corresponding pages where variable information is to be reproduced. The template files are duplicated to create working files. One set of working files is stripped of all area data relating to placement of variable information to create stripped master page files 1120 defining template pages having only fixed information thereon. The stripped master page files are then converted into PDL master page files 1122 expressed in a page description language, such as PostScript®. An optional imposition process may then convert the PDL master page files 1122 into imposed PDL master page files 1124 each representing a side of a piece of paper to be printed with at least one, and, likely, two or more template pages having fixed information only thereon. Such a template page may be identical to that shown in FIG. 6a except that the areas 1110 and 1112 are removed therefrom.

If desired, the template files 1106 may be preimposed before processing by the method shown in FIG. 5. That is, each template file 1106 may be subjected to an imposition process and the imposed template file may then be further processed to obtain the files 1120 and 1122.

A further set of working files is stripped of all fixed information to create stripped variable page files 1126 defining template pages having fixed information removed therefrom and further having the area data defining the areas 1110, 1112. The data representing template pages having variable information thereon are expanded into a set of intermediate page files. In the example of FIGS. 6a and 6b where three books are to be printed, two intermediate page files 1130, 1132 are thus produced. The file 1130 includes a file portion P1-a defining the position of variable information to be produced on the page P1 for the first book. Two other file portions P1-b and P1-c define the position of variable information to be produced on the front pages of the remaining two books. In like fashion, file portions P4-a, P4-b and P4-c represent the position of variable information to be reproduced on the last pages of the three books. At this point, data are also contained in each of the files 1130, 1132 identifying the entries in the database 17 to be placed in the areas 1110, 1112 during printing.

The files 1130, 1132 are then converted into variable page files 1134, 1136. The files 1134, 1136 are identical to the files 1130, 1132, respectively, except that the data in each file identifying entries in the database 17 are replaced by the actual data stored at such entries.

The files 1134, 1136 are converted into PDL variable files 1137, 1138 in a PDL format, for example, Postscript®. An optional imposition process may convert the PDL variable files into imposed final variable page files 1139. If the template files 1106 are preimposed as noted above, then the imposition process for converting the PDL files is not necessary and may be disposed with.

As should be evident from the foregoing, preimposing the template files 1106 achieves a substantial reduction in the processing of files inasmuch as only a relatively small amount of pages defined by the template files 1106 must be subjected to an imposition process, as opposed to imposing the relatively larger number of pages defined by the PDL master page files and the PDL variable files.

The print system 115 operates in response to the press commands in a press command file 1140 and merges the page files 1122, 1137 and 1138 (if no imposition is to be effected or if the template files 1106 are preimposed) or merges the page files 1124 and 1139 (if the pages are imposed by the method of FIG. 5) to create the finished books or book versions.

Figure 9:
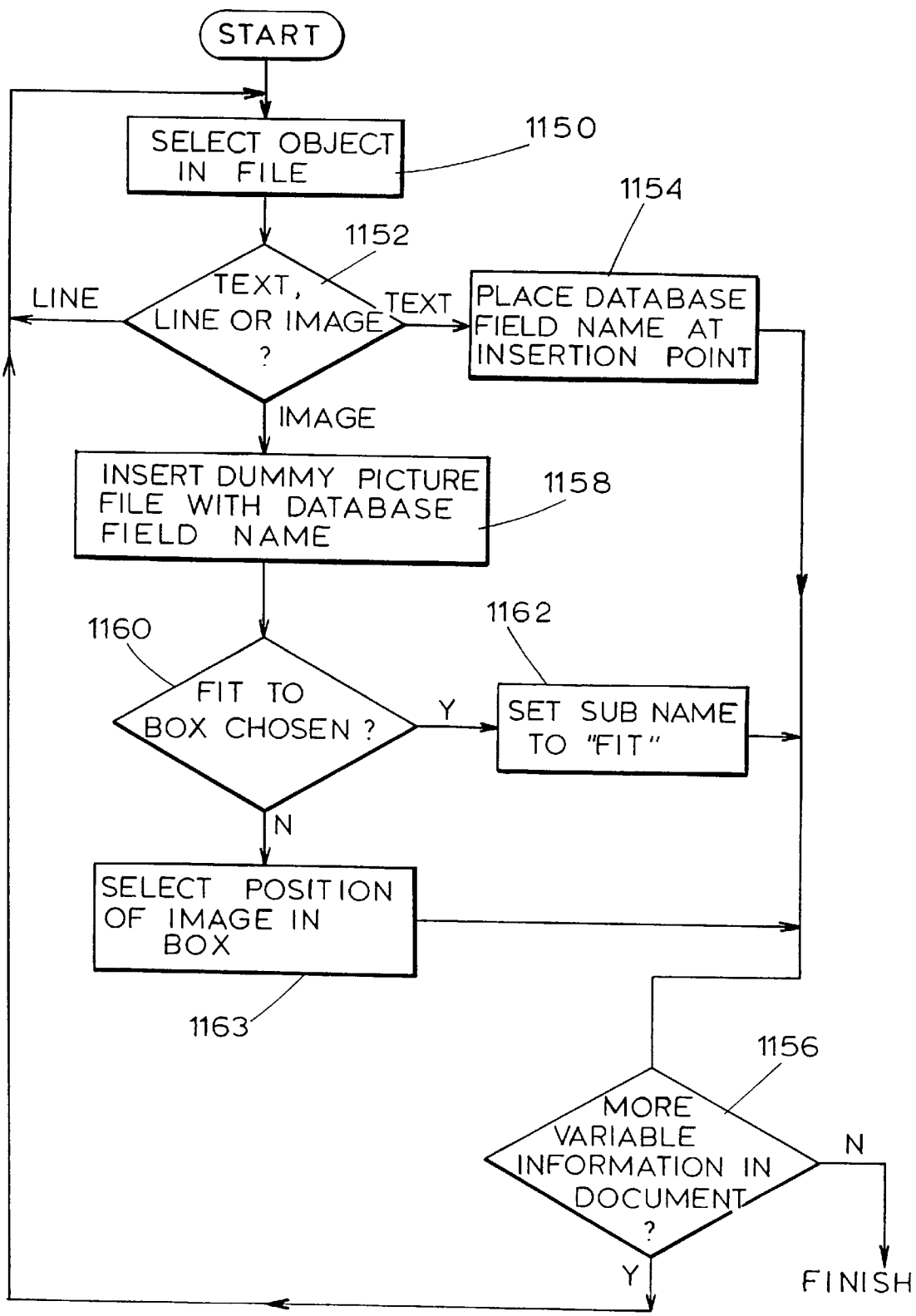
FIG. 9 is a flowchart illustrating programming that may be executed by a user on a personal computer to create the template files 105 of FIG. 5.

FIG. 9 illustrates a flow chart of programming executed by the personal computer 1107 for creating the template file(s) 1106 of FIG. 5 under the assumption that the template files 1106 are not to be preimposed. The programming may be written as an extension of Quark Xpress®, a page make-up program distributed by Quark, Inc. of Denver, Colo. The Quark Xpress® program may be adapted for operation on the Apple® Macintosh® operating system or any other operating system, such as the Microsoft Windows® operating system. Alternatively, a different page make-up program may be used, if desired.

During the make-up process for a book consisting of one or more pages, a template file is created for each book version to be produced, or, where a book is to include two or more parts (referred to as "sections" hereinafter) a template file may be created for each section. At a block 1150 a user may select an area of a page for reproduction of variable information therein, at which point a line object, a text object or an image object may be selected. A block 1152 then checks to determine which type of object has been selected. If a text object has been selected, indicating that variable text is to be inserted at a point defined by the current cursor position on the computer display, the name of the appropriate field in the database 17 is inserted into the template file at the insertion point defined by the current cursor position. If the user wishes to designate more areas for variable information (block 1156) control returns to the block 1150 to await selection by the user. If the user then selects an image object, a box is defined by the user to contain an image at a desired location on a selected page. Control from the block 1152 thereafter passes to a block 1158 which inserts a dummy picture file and an indication of the proper database field name in the template file for the page at the location indicated by the current cursor position. The user will thereafter see the dummy picture file at the insertion point on the display of the computer 1107 when the page is viewed. The dummy picture file will display an indication of which database field will be used for insertion on the respective pages.

Following the block 1158, a block 1160 prompts the user to enter an indication of whether the image object is to be displayed in one of two display formats. If the image is to be displayed in other than the original size thereof, a block 1162 sets a subname defined for the image to "fit" indicating that the image is to be scaled to fit the box. If the image is to be displayed in the original size thereof, a block 1163 prompts a user to select a position for the image at a particular location in the box defined therefor, such as the upper left-hand corner, the lower right-hand corner, or the like. If the user does not select a position, the image is placed in the upper left corner of the image box. Control thereafter proceeds to the block 1156.

If the block 1152 determines that a line object has been selected, control returns directly to the block 1150, inasmuch as variable information cannot be entered into a line object.

At any point during the page make-up process, other functional aspects of the Quark Xpress® program may be invoked as necessary to produce finished pages.

Once the user determines that no more variable data are to be inserted into the document (block 1156), the resulting page template files(s) 1106 are stored on a storage medium, such as an optical disc or other storage device, and/or the file(s) 1106 are downloaded together with the database 17 to the control unit 18.

The data in the database 17 are arranged in an ASCII file wherein the fields are entered into the database in tab-delimited format (i.e, the fields are separated from one another in each record by tab keystrokes and the records are separated from one another by line returns). In addition to the recipient names and addresses noted above, the database 17 may include text to be reproduced on a page or a name of an image file stored in the memory 19 and defining an image to be reproduced on a page. The database 17 may further include an optional field designating the number of copies of each book to be produced, an optional townsort image field, a version identification field indicating book version number if multiple book versions for a publication are to be produced, an optional distribution list field, control data and the like.

A portion of a second sample database 17 is set out below having a header consisting of thirteen fields (i.e., "version," "process code," "addressline1," "addressline2," etc.) and a number of records, nine of which are shown, each having thirteen fields:

identifies the file name for the image and a block 1184 checks the field list to determine whether the file name is included therein. If the file name for the image is included in the field list, then the image comprises variable information and a block 1186 deletes the image block. Otherwise, the block 1186 is skipped and a block 1188 checks to determine whether all images have been processed. If not, a block 1190 selects a next image and control returns to the blocks 1182–1188. Control remains with such blocks until the block 1188 determines that all images have been processed and control then passes to a block 1192. Control also passes to the block 1192 from the block 1178 should the latter determine that there are no images in the template file.

The block 1192 determines whether any text boxes are present in the open template file. If at least one text box is

| Version | Process Code | Addressline1 | Addressline2 | Addressline3 | Addressline4 | Addressline5 | Price1 | Image1 | Price2 | Copies | Barcode | Townsort |
|---------|--------------|--------------|--------------|--------------|--------------|--------------|--------|--------|--------|--------|---------|----------|
| 01 | 05 | William Doe | 123 Elm | Chicago | Illinois | 606248923 | $22.95 | Shoes | $21.95 | 1 | !606248923! | |
| 03 | 07 | Hugh Jorgensen | 56 Maple | Chicago | Illinois | 606248923 | $21.95 | Shirt | $20.95 | 1 | !606248923! | |
| 02 | 06 | Jay P. Morgan | 1313 Park | Chicago | Illinois | 606248924 | $24.95 | Pants | $22.95 | 1 | !606248924! | ■ |
| 02 | 06 | Joe Louis | 819 Elm | LaGrange | Illinois | 605251093 | $19.95 | Pants | $18.95 | 1 | !605251093! | |
| 03 | 07 | John Smith | 926 Cossit | LaGrange | Illinois | 605251093 | $19.95 | Shoes | $15.25 | 1 | !605251093! | |
| 01 | 05 | Len Johnson | 882 Monroe | LaGrange | Illinois | 605251093 | $19.95 | Shoes | $17.25 | 1 | !605251093! | |
| 02 | 06 | Janet Cizmar | 916 Monroe | LaGrange | Illinois | 605251094 | $24.95 | Pants | $21.95 | 1 | !605251094! | ■ |
| 03 | 07 | Jay Schroeder | 88 W. 77th | Brookfield | Illinois | 605241391 | $21.95 | Shirt | $19.95 | 1 | !605241391! | |
| 03 | 07 | John Doe | 129 Madison | Brookfield | Illinois | 605241391 | $22.95 | Shirt | $19.95 | 1 | !605241391! | ■ |

In the example of FIGS. 6a and 6b, the field names ADDRESSLINE1 through ADDRESSLINE5, BARCODE and TOWNSORT may appear in the area 112 and one or more of the field names PRICE1, IMAGE1 AND PRICE2 may appear in the area 110. Inasmuch as only a single version and a single publication are to be produced in the example of FIGS. 6a and 6b, the VERSION and PROCESS CODE fields would not be used. The COPIES field may be used as a control code to select the number of book copies to be produced.

Alternatively, the books represented by the records of the database 17 sample shown above may be of diverse publications, in which case the data in some or all of the fields would be different than that shown above.

Figure 10A:
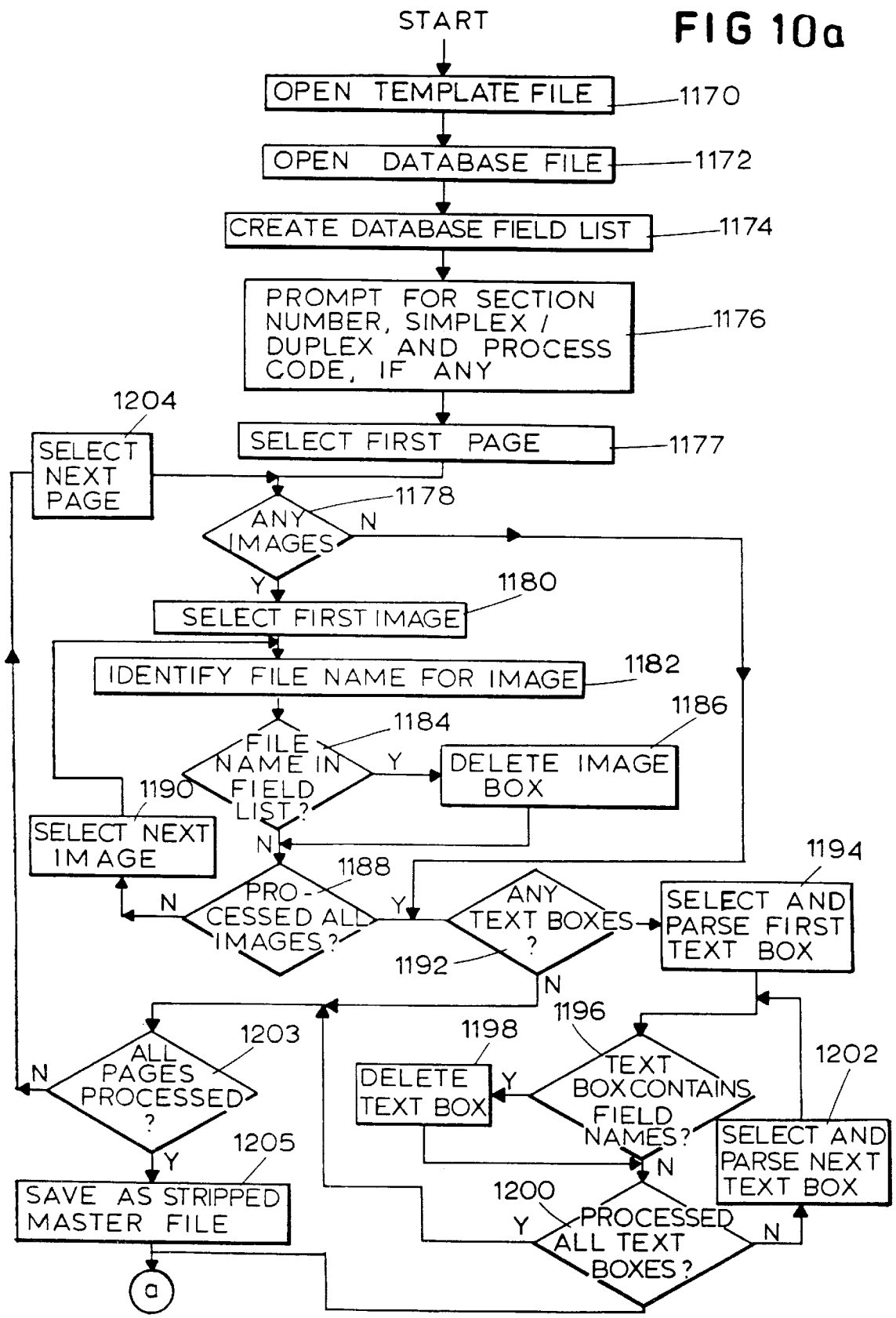
FIGS. 10a–10f, when joined along similarly-lettered lines, together represent programming executed by the control unit 52 of FIG. 3 to implement the present invention.

Once the template file(s) 1106 and the database 17 are assembled, the programming of FIGS. 10a–10f may be executed by the control unit 18 to create the master page files 1122 or 1124, the final variable page files 1137, 1138 or 1139, and the press command file 1140. Referring first to FIG. 10a, a block 1170 prompts a user to select a template file 1106 and a block 1172 opens the database 17. A block 1174 then reads and stores in a list the database field names for later reference and a block 1176 prompts a user to enter information indicating a section number and whether pages are to be printed in simplex (i.e., single-sided) or duplex (i.e., double-sided) format. The section number identifies the order in which multiple sections are to be processed for a particular book. The user may also be prompted to enter a process code identifying a particular book version to process if multiple versions of a publication are to be produced during a single press run.

Following the block 1176, a block 1177 begins the process of stripping variable information from the template file opened by the block 1170 to obtain the stripped master file 1120 of FIG. 5. The block 1177 selects a first page for processing and a block 1178 checks to determine whether there are any images in the template file and, if images are located, a block 1180 selects a first image. A block 1182 present, a block 1194 selects and parses a first text box and a block 1196 checks to determine whether the text box includes at least one of the field names of the database 17. If so, then it has been determined that the text box includes variable information and a block 1198 deletes the text box. Otherwise, the block 1198 is skipped and a block 1200 checks to determine whether all text boxes in the template file have been processed. If not, a block 1202 selects and parses the next text box in the template file and control returns to the blocks 1196–1200. Control remains with such blocks until all text boxes have been processed, whereupon a block 1203 determines whether all pages have been processed. If not, a block 1204 selects a next page and control returns to the block 1178. Otherwise, a block 1205 saves the resulting file as the stripped master file.

Control also bypasses the blocks 1194–1202 and proceeds directly from the block 1192 to the block 1203 if there are no text boxes in the open template file.

Figure 10B:
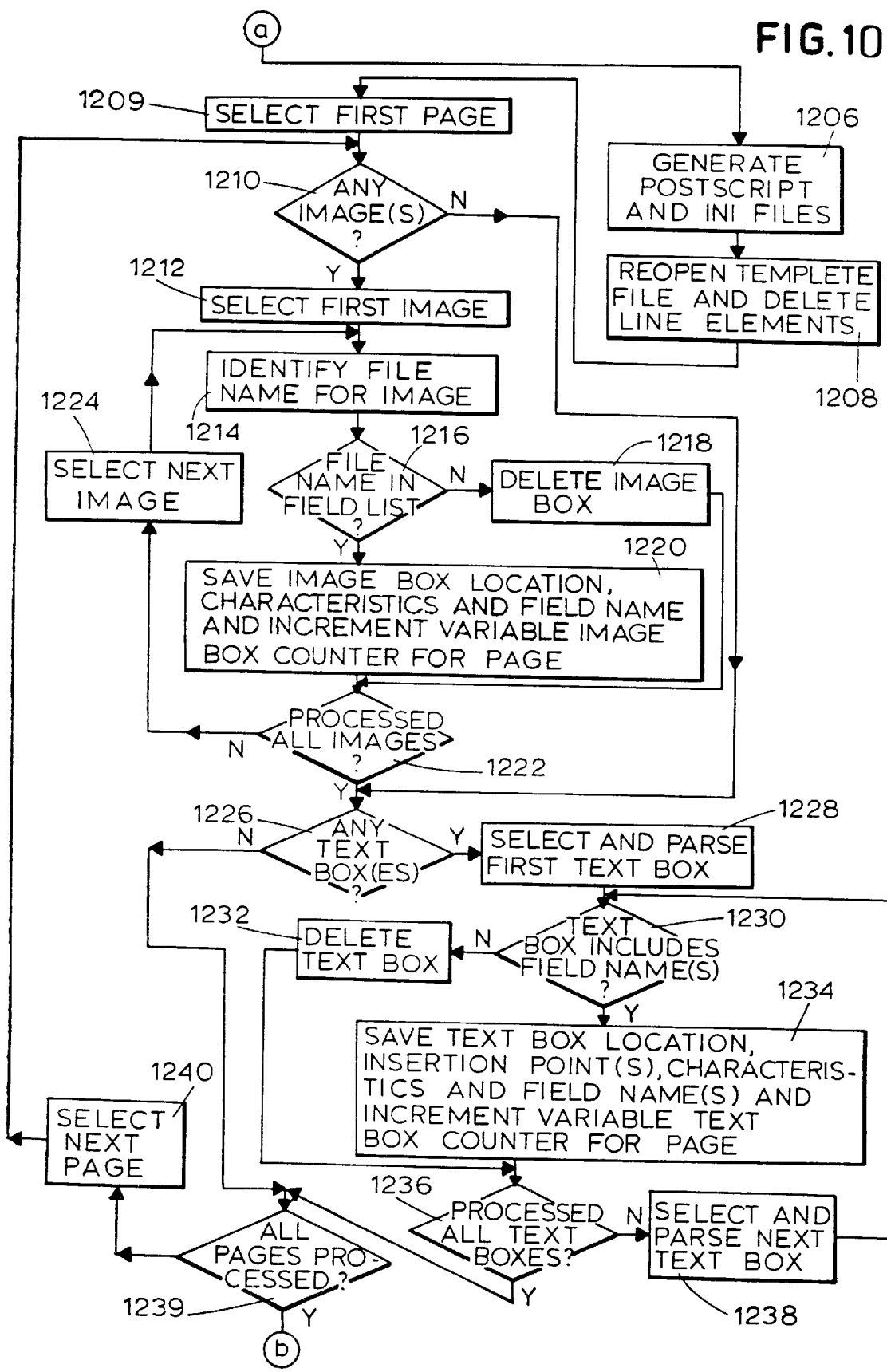

Following the block 1205, a block 1206, FIG. 10b, converts the stripped master file into the PDL master page file 1122 of FIG. 5. At the same time, an initialization (or INI) file is created in ASCII code according to the following format:

| | |
|---|---|
| name: | [file path/name] |
| psx: | [dimension] |
| psy: | [dimension] |
| ssx: | [dimension] |
| ssy: | [dimension] |
| posx: | [dimension] |
| posy: | [dimension] |
| duplex: | [zero or one] |
| orientation: | [zero or one] |
| output: | [filename] |
| copies: | [number] |

Where "psx" and "psy" refer to finished page sizes in x and y directions, "ssx" and "ssy" refer to cut sheet size in x and y directions, "posx" and "posy" refer to offsets in x and y directions specifying placement of each page on a cut sheet, "duplex" refers to single or two-sided printing, "orientation" refers to portrait or landscape printing, "output" refers to the name of the output file and "copies" refers to the number of copies to be printed. A sample INI file which specifies parameters for printing of a file called MYJOB.PS is as follows:

| Name: | C:/jobs/myjob.ps |
|---|---|
| psx: | 8000 |
| psy: | 11000 |
| ssx: | 11500 |
| ssy: | 9000 |
| posx: | 150 |
| posy: | 150 |
| duplex: | 1 |
| orientation: | 1 |
| output: | myjob.ps |
| copies: | 1 |

In the foregoing example, one copy of the file MYJOB.PS is to be printed in duplex and portrait formats at an offset of 0.15×0.15 inches from a corner of a finished sheet of paper of size 8×11 inches cut from a sheet originally having dimensions of 9×11.5 inches.

Following the block 1206, a block 1208 then reopens the same template file originally opened by the block 1170 to begin the process of creating the stripped variable page files 1126 of FIG. 5. A block 1209 selects a first page and a block 1210 checks to determine whether there are any images in the file and, if so, a block 1212 selects a first image for consideration. A block 1214 identifies the file name for the image and if a block 1216 determines that the file name is not in the field list, then the image comprises fixed information (i.e., the image will be the same in all of the books of a given publication version) and hence the image box is deleted by a block 1218.

On the other hand, if the file name for the image is in the database field list, then the image is of the variable type (i.e., the image changes with the books of a given publication version), and hence a block 1220 identifies and saves the image box location on the page, the characteristics of the image box, such as the size, skew, background color, subname and the like and further saves the field name of the image from the database 17. Also, a counter in the memory 19 which tracks the number of variable image boxes on the page is incremented.

Control from the blocks 1218 and 1220 passes to a block 1222 which checks to determine whether all images have been processed. If not, a block 1224 selects a next image and control returns to the blocks 1214–1222. Otherwise, control proceeds to a block 1226 which begins the process of selecting and identifying text boxes. If there are text boxes present in the template file, a block 1228 selects and parses a first text box and a block 1230 checks the parsed text box to determine whether it includes one or more field names from the database. If not, then it has been determined that the text box includes only fixed information, and hence a block 1232 deletes the text box. Otherwise, a block 1234 stores the text box location, the insertion points in the text box at which variable information is to be printed and the characteristics of the text box and the field names of the database 17 identified in such text box in the memory 19. In addition, a variable text box counter is incremented representing the number of text boxes appearing on each page.

Control from the blocks 1232 and 1234 proceeds to a block 1236 which checks to determine whether all text boxes have been processed. If not, a block 1238 selects and parses the next text box and control returns to the blocks 1230–1236. Once all text boxes have been processed, or if the block 1226 determines that there are no text boxes in the template file, a block 1239 determines whether all pages have been processed and, if not, a block 1240 selects the next page and control returns to the block 1210. Otherwise, control passes to a block 1241, FIG. 10c, which saves the resulting file as the stripped variable file 1126 of FIG. 5.

Control also passes to the block 1239 from the block 1226 if there are no text boxes found.

A block 1242 then creates a working copy of the stripped variable file 1126 and a first page having variable data thereon is selected and data representing the remaining pages in the file are deleted by a block 1244. A block 1246 then deletes the data representing remaining pages in the file. In the example of FIGS. 6a and 6b, the block 1244 creates a file defining the front page of a book with all fixed information deleted therefrom and an area reserved for variable information.

Following the block 1244, a block 1246 selects a first record in the database 17 and a block 1248 reads the record. An optional block 1250 checks to determine whether a selective processing code has been entered by the user indicating that the page is to undergo selective page processing. As noted above, the apparatus and method of the present invention may be utilized to produce not only books of a single version (i.e., where corresponding pages differ only in terms of the variable information stored in the database) but also books of different versions. In the latter case, the books of different versions have different fixed and variable information. The fixed and/or variable information may vary in terms of content or appearance (i.e., style, location, rotation, position, etc.) or both in different versions. This is also true, of course, in the case of different publications.

If the block 1250 determines that selective page processing is to be undertaken, then a block 1252 checks to determine whether the database record read by the block 1248 is utilized on the page currently under consideration. If this is not the case, a block 1253 checks to determine whether the record currently under consideration is the last in the database. If so, control passes to a block 1294 of FIG. 10e. Otherwise, a block 1254 selects a next record in the database 17 and control returns to the block 1248 where the next database record is read.

If the block 1250 determines that selective page processing is not to be undertaken, or if the block 1252 determines that the record read by the block 1248 is used in the page currently under consideration, a block 1256 duplicates the data representing the page remaining after execution by the block 1244 to initiate development of one of the files 1130 or 1132. In the first pass through the program of FIG. 10c, and in connection with the example of FIGS. 6a and 6b, the block 1256 creates the file 1130 and develops page data representing a first version of the page P1-a and adds further variable information to such page data during immediately succeeding passes through the program. Thereafter, data representing the remaining pages P1-b, P1-c and P4-a through P4-c are created and variable information is added to such pages serially during subsequent passes.

A block 1258 checks to determine whether there are any image boxes on the page and, if so, a block 1260 selects a first image box. A block 1262 then inserts the image identified by the database field into the image box. A block 1264, FIG. 10d, checks the subname to determine whether the block 1162 of FIG. 9 has indicated that the image should be sized to fit the image box. If this is true, a block 1266 performs the scaling. Otherwise, a block 1268 positions the image in the image box at the position specified by the user. A block 1270 follows the blocks 1266 and 1268 and checks to determine whether all image boxes have been processed. If not all image boxes have been processed, a block 1272 selects a next image box on the page and control returns to the blocks 1262–1270 so that remaining image boxes are serially processed.

Figure 10C:
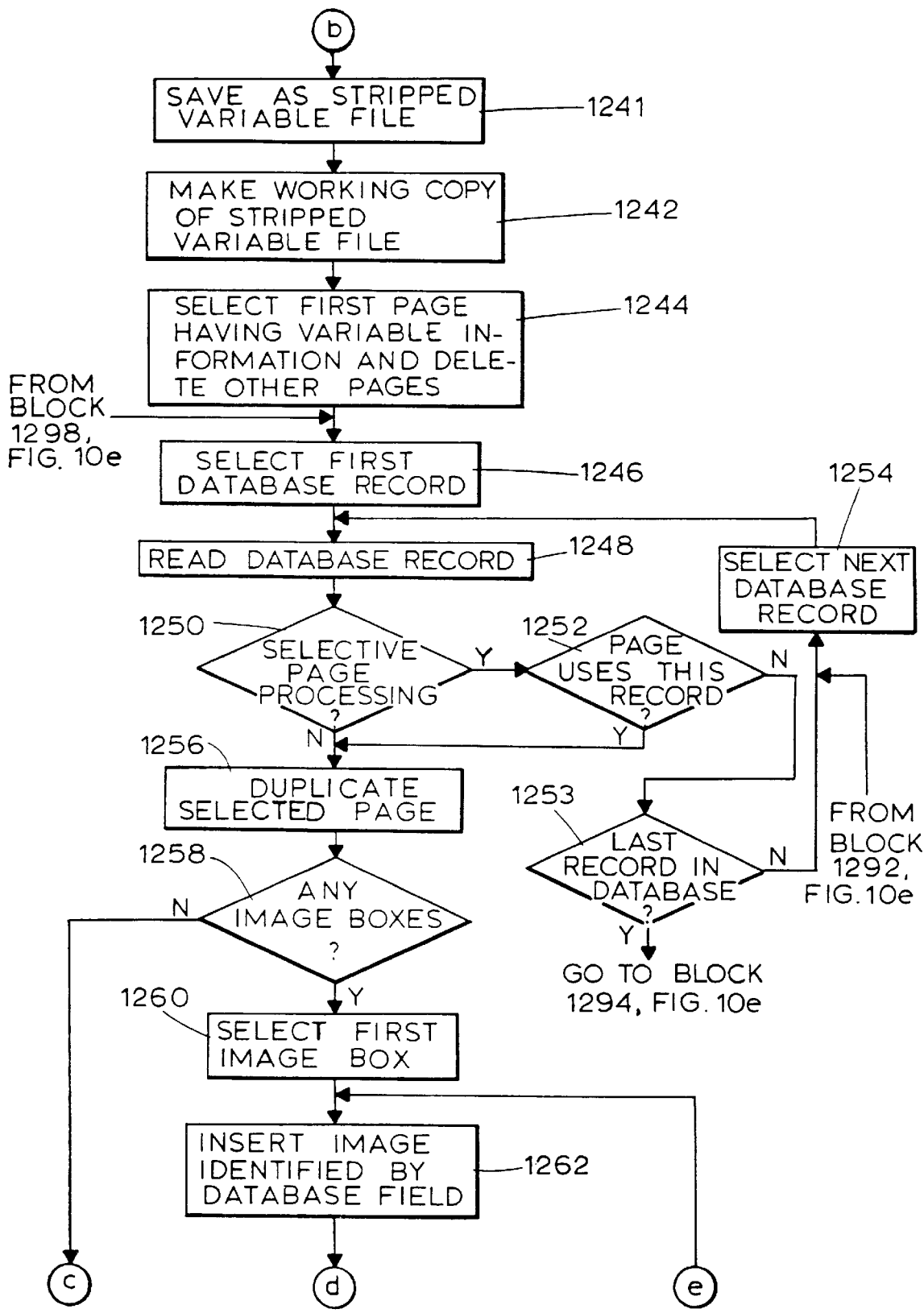
Figure 10D:
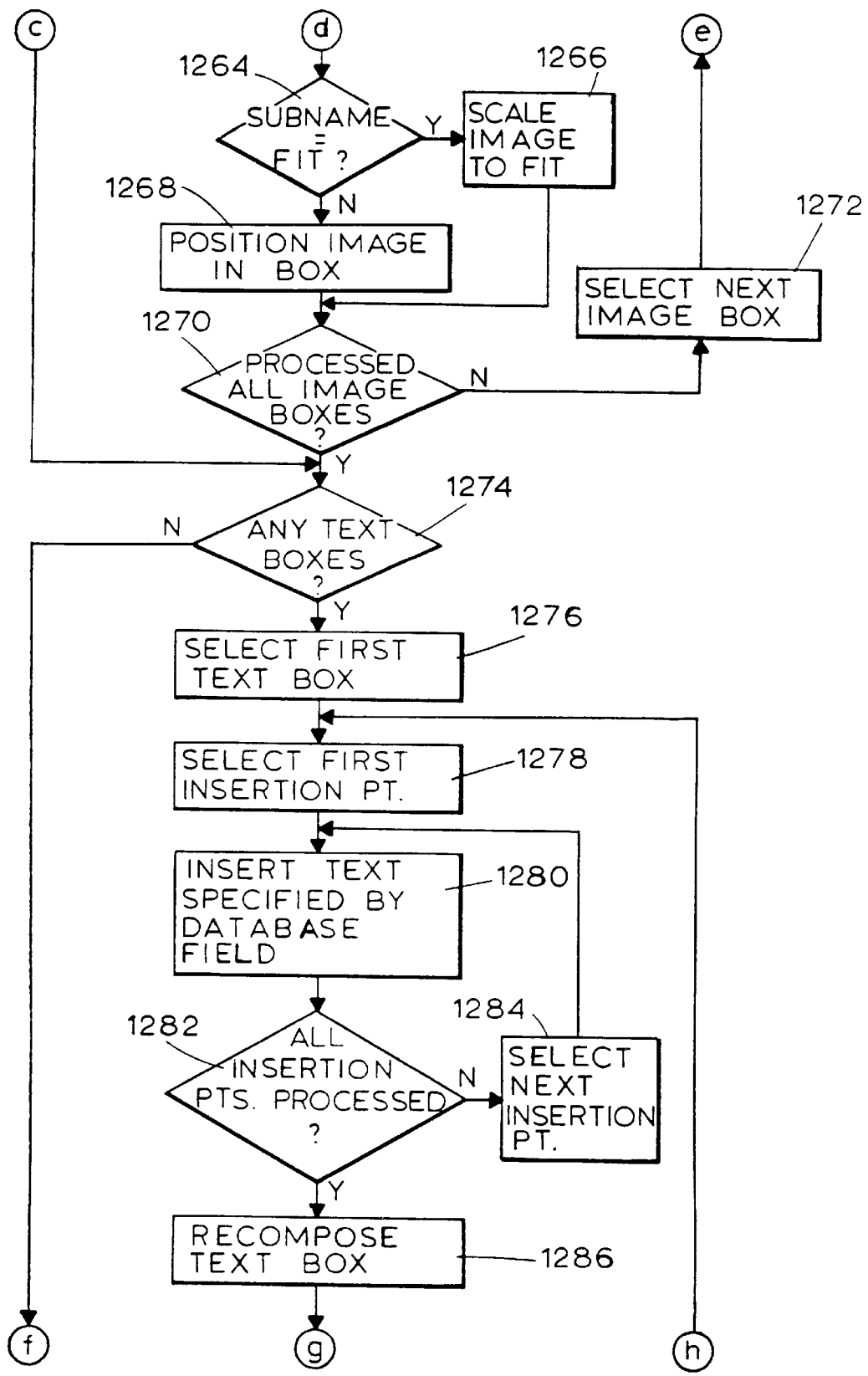
Figure 10E:
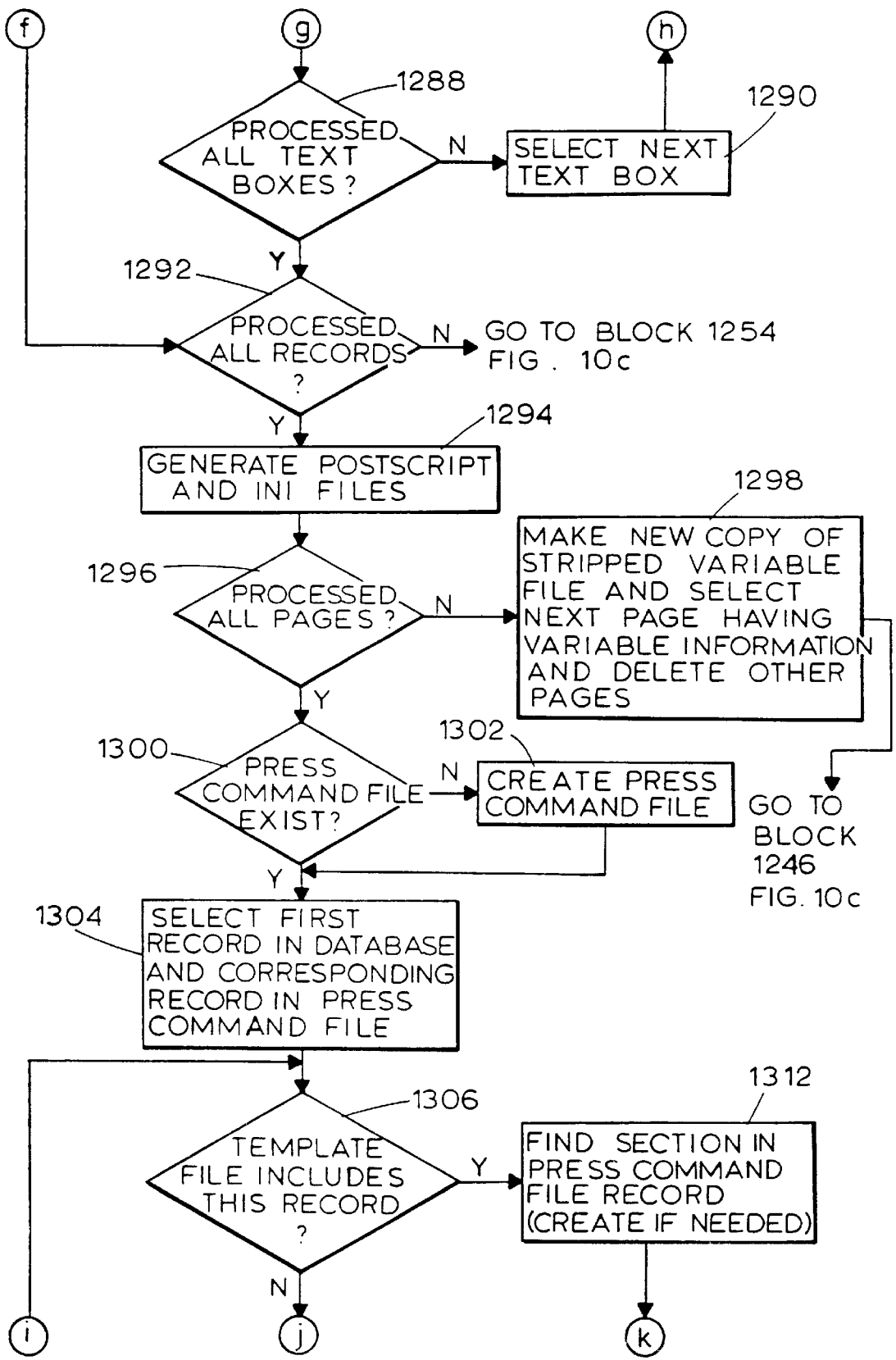

Once the block 1270 determines that all image boxes have been processed, or immediately following the block 1258 of FIG. 10c if no image boxes are found on the page, a block 1274 checks to determine whether there are any text boxes on the page and, if so, a pair of blocks 1276, 1278 select a first text box and a first insertion point in such box. Blocks 1280, 1282 and 1284 serially insert text data stored in the database 17 at the appropriate insertion points in the text box. Once all of the variable text data have been inserted into the text box, a block 1286 recomposes all text in the text box so that the text obtains a neat finished appearance. The recomposition process is automatically undertaken by the Quark Xpress® program once the variable information is inserted into each text box. The recomposition process is responsive to the user commands as applied to the template file page, such as left, right, center, or full justification, hyphenation and the like. Following the block 1286, a block 1288, FIG. 10e, checks to determine whether there are remaining text boxes to be processed on the page and, if so, a block 1290 selects the next text box on the page and control returns to the blocks 1278–1288 to insert text information into such text boxes.

Once the block 1288 determines that all text boxes for the page have been processed, the programming required to produce one of the pages of the file 1134 of FIG. 5 having variable information only thereon is complete. A block 1292 then determines whether all records in the database have been considered for inclusion in additional variable pages of the file 1134 to be produced. If not all records have been considered, control returns to the block 1254, FIG. 10c, where the next database record is identified and read. On the other hand, if all pages of the file 1134 have been produced by considering all records in the database 17, a block 1294 converts the file data into Postscript® or another PDL format to create the variable page file 1137 of FIG. 5. Also, an INI file is created as before, except that the "duplex" parameter is set to command simplex printing only. If necessary or desirable, should the press run length exceed a certain limit, the programming may be modified to create more than one variable page file for each variable page of the template file.

Following the block 1294, a block 1296 checks to determine whether there are other variable pages in the stripped variable page file to be processed. If this is true, a block 1298 produces a new copy of the stripped variable file, selects the next variable page therein and deletes remaining pages therefrom. Control then returns to the block 1246 of FIG. 10c. In the example of FIGS. 6a and 6b, the back page P4 and the corresponding pages of the remaining books are now selected for processing. In the fashion noted above, a file representing the variable portions of such pages is produced by developing the file representing the pages P4-a through P4-c and inserting the database information into such file to obtain the variable page file 1136 and the PDL version 1138.

Following generation of the variable page files 1134, 1136, and 1137, 1138 control passes to a block 1300 which checks to determine whether a press command file has already been created. If not, a file is created by a block 1302 having placeholder comments indicating where in the press command file individual press commands are to be placed for each book to be produced. The press command file may also include data from one or more fields of the database 17 identifying an intended recipient of each book to be produced to assist in reproducing books found to be defective or to produce sample books. At this point, the press command file for the example of FIGS. 6a and 6b may be as follows (using data from the sample database set out above):

;RECORD1
;:WILLIAM DOE:606248923
;ENDRECORD
;RECORD2
;:HUGH JORGENSEN:606248923
;END RECORD
;RECORD3
;:JAY P. MORGAN:606248924
;END RECORD

Following the block 1300 (if the press command file already exists) or the block 1302, a block 1304 selects the first database record and a corresponding first record in the press command file. A block 1306 then checks to determine whether the template file currently being processed includes the selected database record. If not, a block 1308 determines whether all pages have been processed, and if this is not the case, the next record in the database 17 and a corresponding record in the press command file are selected. Control then returns to the block 1306. If the block 1306 ascertains that the template file includes the selected record, a block 1312 inserts an indication of the section number in the press command file at an appropriate point if the section number is not already present. If the section number is present already, the press command identified by the section number entered by the user at the block 1176 is identified to be overwritten at a later point. The press command file now appears as follows for the example of FIGS. 6a and 6b:

;RECORD1
;:WILLIAM DOE:606248923
;SECTION 1
;ENDSECTION
;ENDRECORD
;RECORD2
;:HUGH JORGENSEN:6062488923
;SECTION 1
;ENDSECTION
;END RECORD
;RECORD3
;:JAY P. MORGAN:606248924
;SECTION 1
;END SECTION
;END RECORD

Figure 10F:
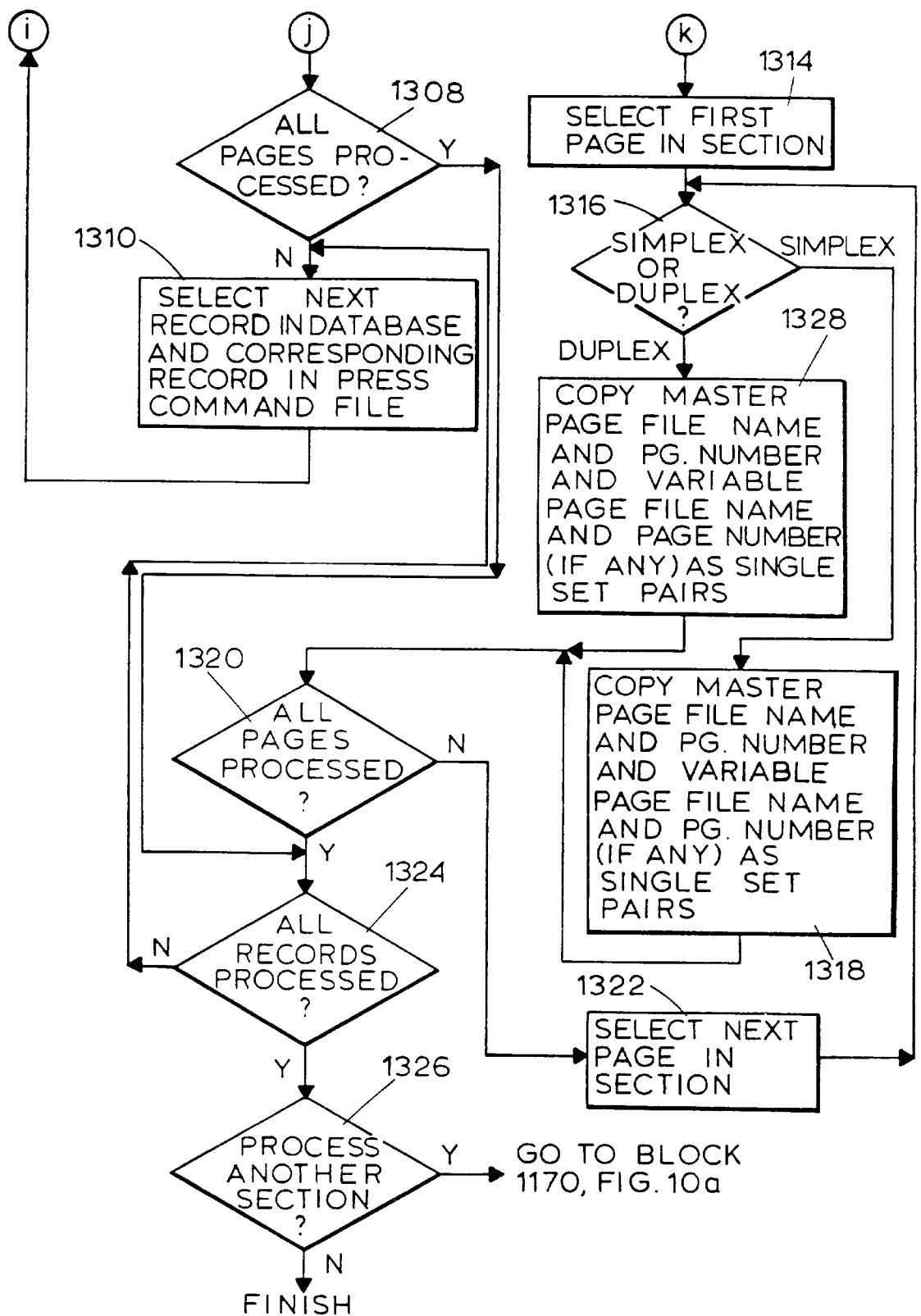

Following the block 1312, a block 1314, FIG. 10f, selects a first page of the section and a block 1316 checks the state of a flag stored in the memory 19 to determine whether a simplex or duplex job has been requested. If a simplex job has been requested, the file name and page number of the master page file and, if variable information is to appear on the page, the file name and page number of the variable page file for the selected page are stored as a single set pair in the memory 19 by a block 1318. The determination of whether variable information is to appear on the selected page is accomplished by summing the contents of the variable image box counter and the variable text box counter as incremented by the blocks 1220 and 1234 of FIG. 10b.

A block 1320 checks to determine whether all pages have been processed and, if not, the next page is selected by a block 1322 and control returns to the block 1316 for processing of such page. If all pages have been processed, control passes to a block 1324 which determines whether all database and press command records have been processed. Control also passes to the block 1324 if the block 1308 determines that all pages have been processed. If not all records have been processed at this point, control returns to the block 1310 where the next records in the database and press command file are selected.

If the block 1324 determines that all records for the current section have been processed, a block 1326 determines whether another section is to be processed and, if so, control returns to the block 1170 of FIG. 10*a*. If there is not another section to be processed, the press command file has been fully assembled, and hence the process terminates.

If the block 1316 determines that a duplex job is to be effected, control passes to a block 1328 which stores in the memory 19 a command identifying the file names and page numbers of the master page file (as well as corresponding information relative to variable page files, if variable information is to appear) as two-set pairs. Control from the block 1328 then passes to the block 1320 described above.

The result of the programming of FIGS. 10*a*–10*f* is a press command file having a sequence of press commands which cause printing of pages in a desired order. In the example of FIGS. 6*a* and 6*b*, the press command file would read as follows:

BOOK A
;RECORD1
;:WILLIAM DOE:606248923
;SECTION 1
"file.m"1@"file.1"1|"file.m"2
"file.m"3|"file.m"4@"file.4"1
;ENDSECTION
;ENDRECORD
;RECORD2
;:HUGH JORGENSEN:606248923
;SECTION 1
"file.m"1@"file.1"2|"file.m"2
"file.m"3|"file.m"4@"file.4"2
;ENDSECTION
;ENDRECORD
;RECORD3
;:JAY P. MORGAN:606248924
;SECTION 1
"file.m"1@"file.1"3|"file.m"2
"file.m"3|"file.m"4@"file.4"3
;ENDSECTION
;ENDRECORD
ENDBOOK
PRINTRUN R
BOOK A
ENDPRINTRUN In the foregoing example, "file.m" is a file name identifying the master page file 1122 and "file.1" and "file.4" are file names identifying the variable page files 1137 and 1138, respectively. The number following each file name designates a particular page of the file identified by the file name. Thus, for example, "file.m" 1 designates the first page of the master file "file.m" and "file.1" 2 designates the second page of the variable page file "file.1." The @ sign means to associate the pages of the files linked by such sign and the vertical line in the commands indicates that the page(s) on the left side of the vertical line are to be printed on the front side of a piece of paper whereas the page(s) on the right side of the vertical line are to be printed on the reverse side of the piece of paper. In an example of simplex printing, no file name would appear to the right of the vertical line in each command.

Figure 11A:
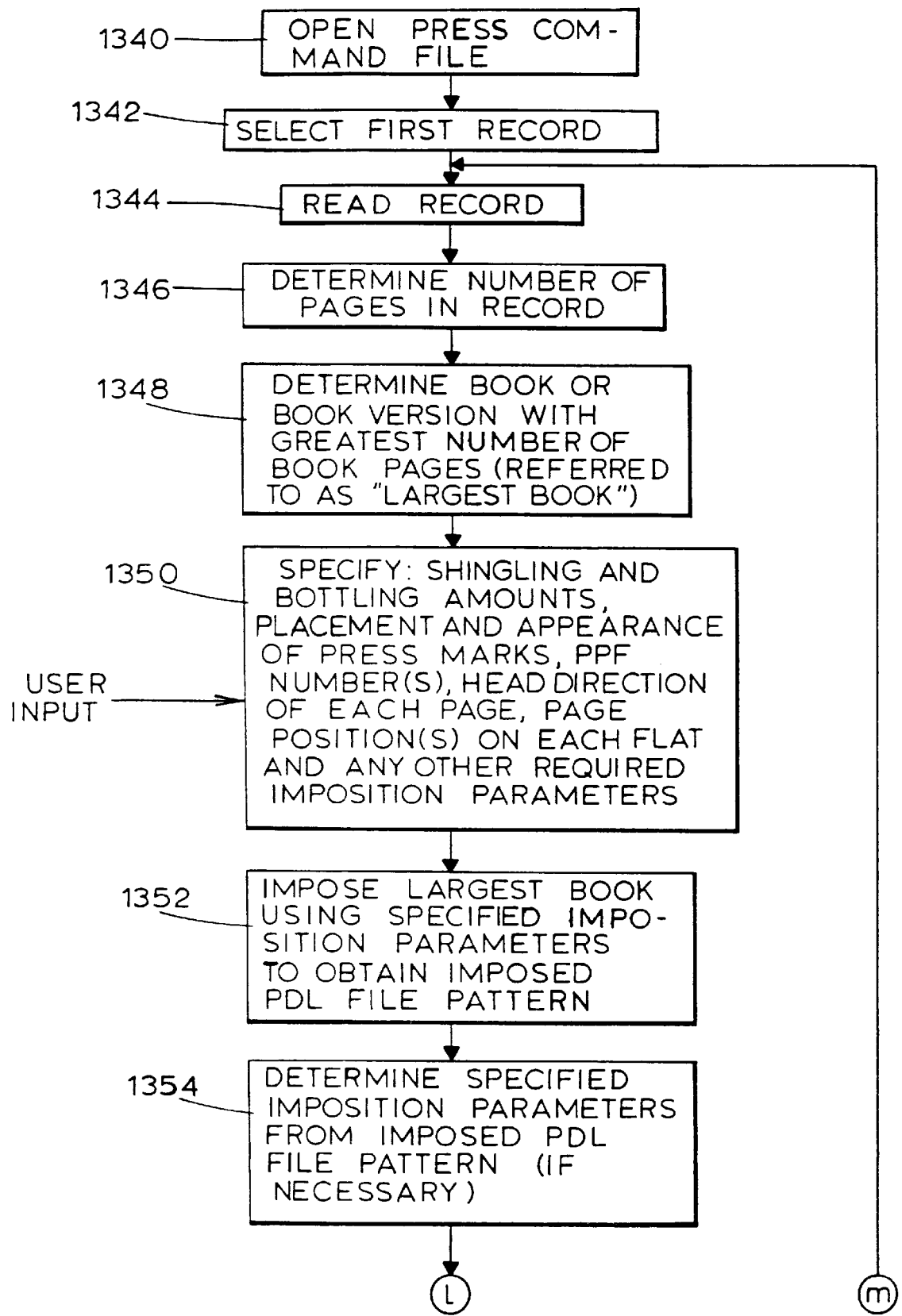
FIGS. 11a–11c, when joined along the similarly-lettered lines, together represent programming executed by the control unit 52 of FIG. 3 to impose pages to be printed by one of the demand printing systems of FIG. 3.
Figure 11B:
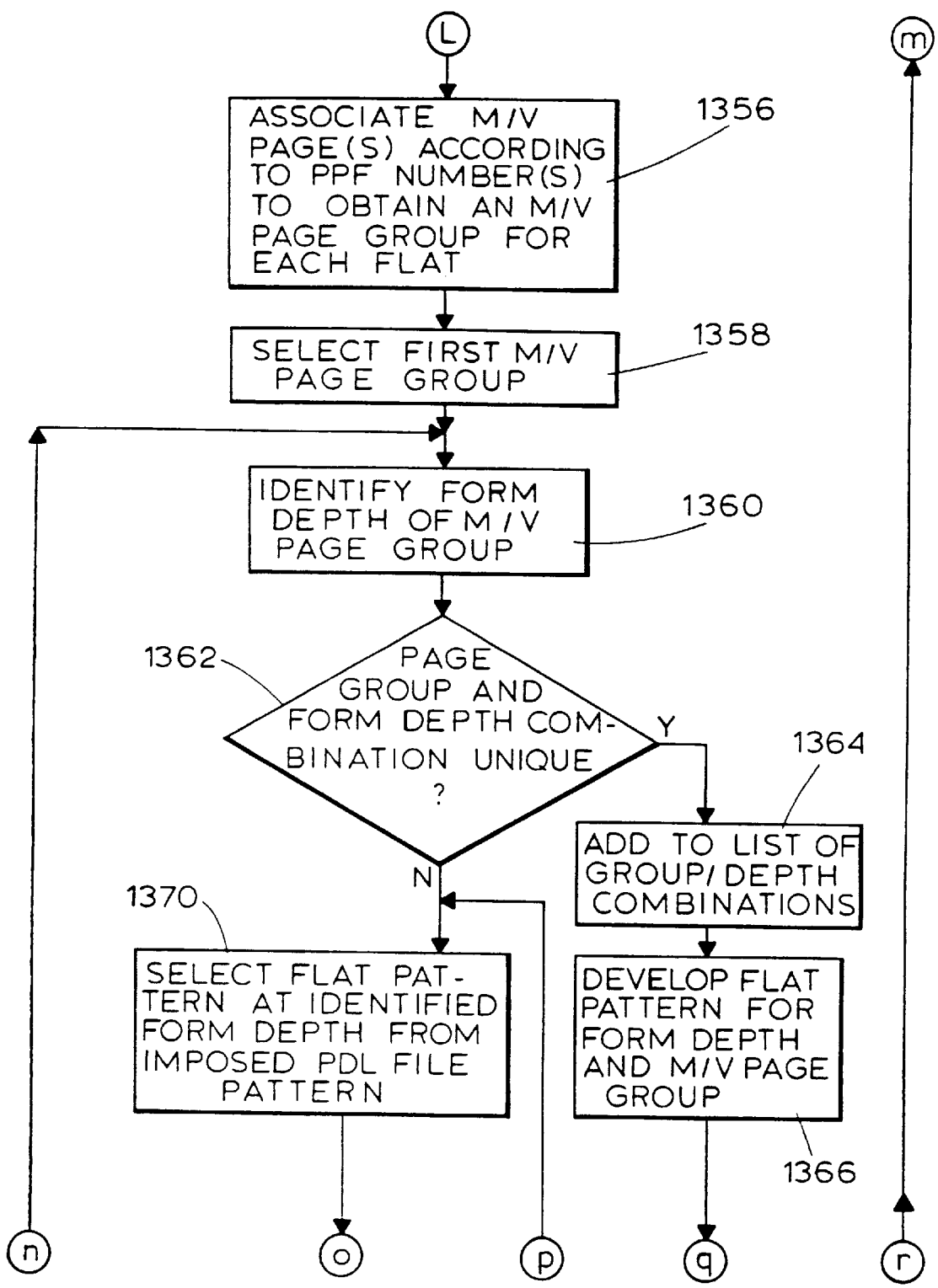
Figure 11C:
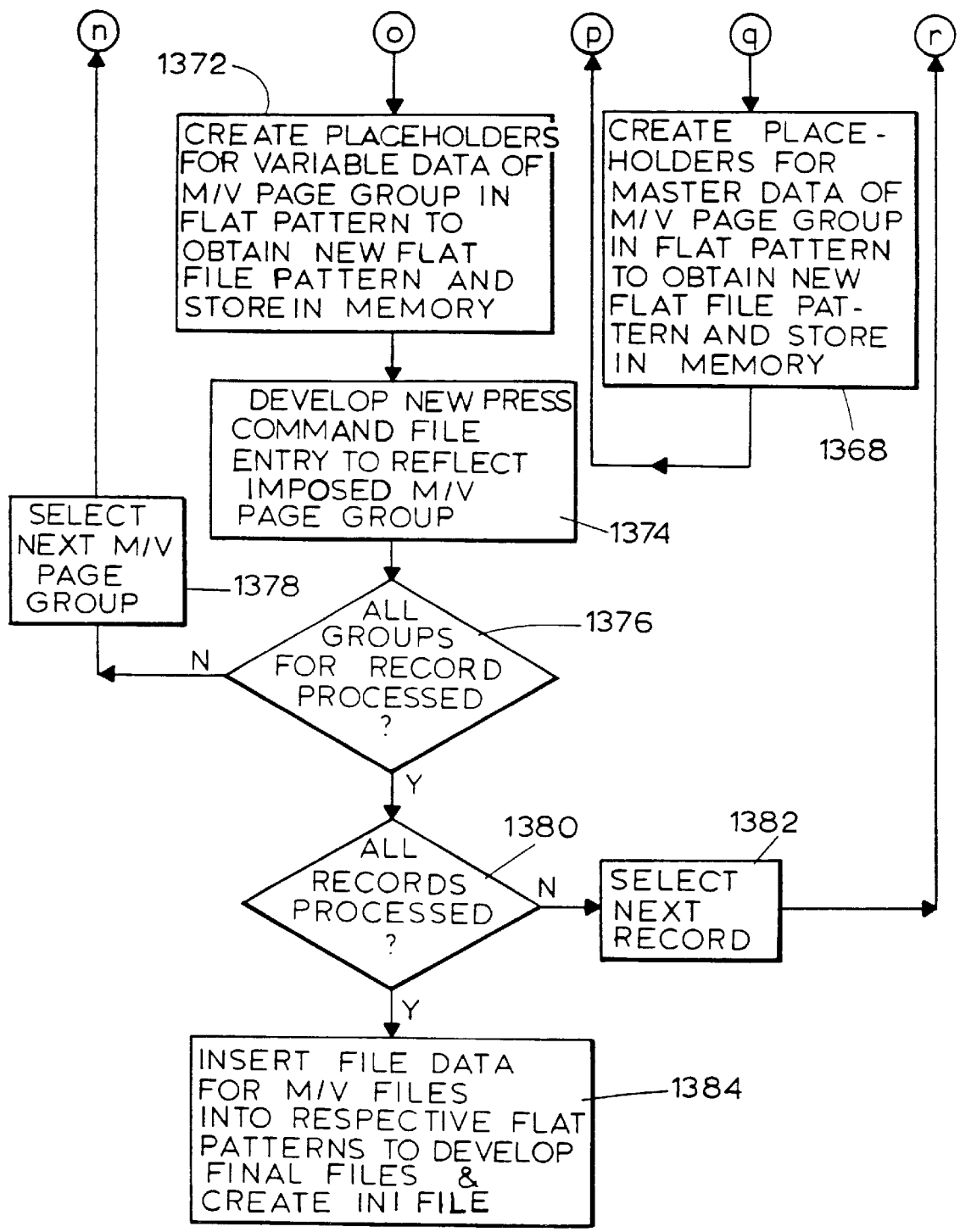

FIGS. 11*a*–11*c* illustrate an exemplary imposition system which may be used to impose pages for printing, under the assumption that the template files 106 are not preimposed. The imposition system of FIGS. 11*a*–11*c* is invoked to create a new press command file which prints at least one, and likely two or more pages on one or both sides of a form. The programming begins at blocks 1340 and 1342 which open the press command file and select a first record therein. A block 1344 then reads such record and a block 1346 determines the number of master pages that are in the press command file record read by the block 1344. In the example shown in FIGS. 6*a* and 6*b*, and as defined in the press command file example set forth above, each book includes four master pages. The block 1346 determines the number of master pages in the record to determine page assignments to the various forms. As noted above, "form" designates a single sheet of paper as printed by the press. Each form has two sides, each of which is referred to as a "flat." Each flat includes a number of pages thereon, wherein the number is hereinafter referred to as the "PPF" number (for "pages-per-flat" number).

A block 1348 determines the book or the book version to be produced during the print job having the greatest number of book pages. This book or book version is hereinafter referred to as the "largest book". A block 1350 then prompts a user to enter various imposition parameters including shingling and bottling amounts, placement and appearance of press marks, head direction of each page (when not all pages have the same head direction, for example, as seen in FIGS. 8*a* and 8*b*) page position(s) on each flat and any other required imposition parameters. In addition, the user is prompted to enter the PPF number for each flat type to be produced. For example, the user may be prompted to enter a PPF number of two for the examples of FIGS. 6*a*, 6*b* and 7*a*, 7*b* and a PPF number of four for the example of FIGS. 8*a* and 8*b*. The parameters may be specified by a user using any commercially available and suitable imposition system such as Preps®, by ScenicSoft, Inc. of Everett, Wash., Impostrip®, by Ultimate Technographics of Montreal, Quebec, Canada, Quark Imposition® by Quark, Inc. of Denver, Colo., or any other system. Alternatively, the imposition system disclosed in Sands et al. U.S. patent application Ser. No. 738,217, filed Jul. 30, 1991, and entitled "Digital Page Imaging System" can be used.

Following the block 1350 a block 1352 develops an imposition pattern allowing a block 1354 to derive the specified imposition patterns. The step effected by the block 1352 is necessary inasmuch as the specified imposition parameters are not directly available to such programming, and hence the parameters must be obtained by selecting the largest book or book version to be produced and imposing same so that the imposition parameters can be deduced therefrom. If the imposition parameters can be provided to the programming of FIGS. 11*b* and 11*c* directly, then the blocks 1352 and 1354 would be unnecessary and may be omitted.

Following the block 1354, a block 1356, FIG. 11*b*, associates master and variable pages to appear on the same flat with each other according to the PPF number for such flat to obtain a master/variable page group for each flat. In the example of FIG. 6a, the master and variable files for the pages P1 and P4 would be associated together. In the example of FIG. 8a, the master and variable files for the pages P9, P12, P13 and P16 would be associated by the block 1356.

A block 1358 then selects a first master/variable page group and a block 1360 determines the form depth of the master/variable page group. The "form depth" is the position of a printed flat in a stack of forms which are stitched together to produce a book.

Following the block 1360, a block 1362 checks to determine whether the form depth and the identity of the master/variable page group are a unique combination. If so, a block 1364 creates a list in the memory 19 of group/depth combinations (if such list has not already been created) and adds the current group and form depth combination to such list.

Following the block 1364, a block 1366 develops and saves a flat pattern defining a template for the master/variable page group, taking into account the form depth of such group. The flat pattern is a file defining the positions of the pages associated as a group by the block 1356. A block 1368 then creates placeholders for the master data of the master/variable page group in the flat pattern so that a new flat file pattern is obtained. The new flat file pattern is stored in the memory 19 and control passes to a block 1370, FIG. 11b. Control also passes directly to the block 1370 from the block 1362, bypassing the blocks 1364–1368, if the page group identity and form depth combination is not unique.

The block 1370 identifies and selects the flat pattern from the imposed PDL file pattern developed by the block 1352 at the form depth of the selected master/variable page group. A block 1372, FIG. 11c, then creates place holders for variable data of the master/variable page group in the flat patterns selected by the block 1370 to obtain a new flat pattern which is then stored in the memory 19. A block 1374 thereafter develops a new press command file entry to reflect the imposed master/variable page group.

Following the block 1374, a block 1376 checks to determine whether all master/variable groups for the record of the press command file currently under consideration have been processed. If not, a block 1378 selects the next master/variable page group and control returns to the block 1360 of FIG. 11b. Otherwise, a block 1380 checks to determine whether all records in the press command file have been processed. If not, a block 1382 selects the next record and control returns to the block 1344 of FIG. 11a. If all records have been processed, a block 1384 inserts the file data for the master/variable files into the placeholders in the respective flat patterns to develop the imposed master and variable page files 1124 and 1139 of FIG. 5. A suitable INI file is also created to reflect the new flat geometry.

Figure 12:
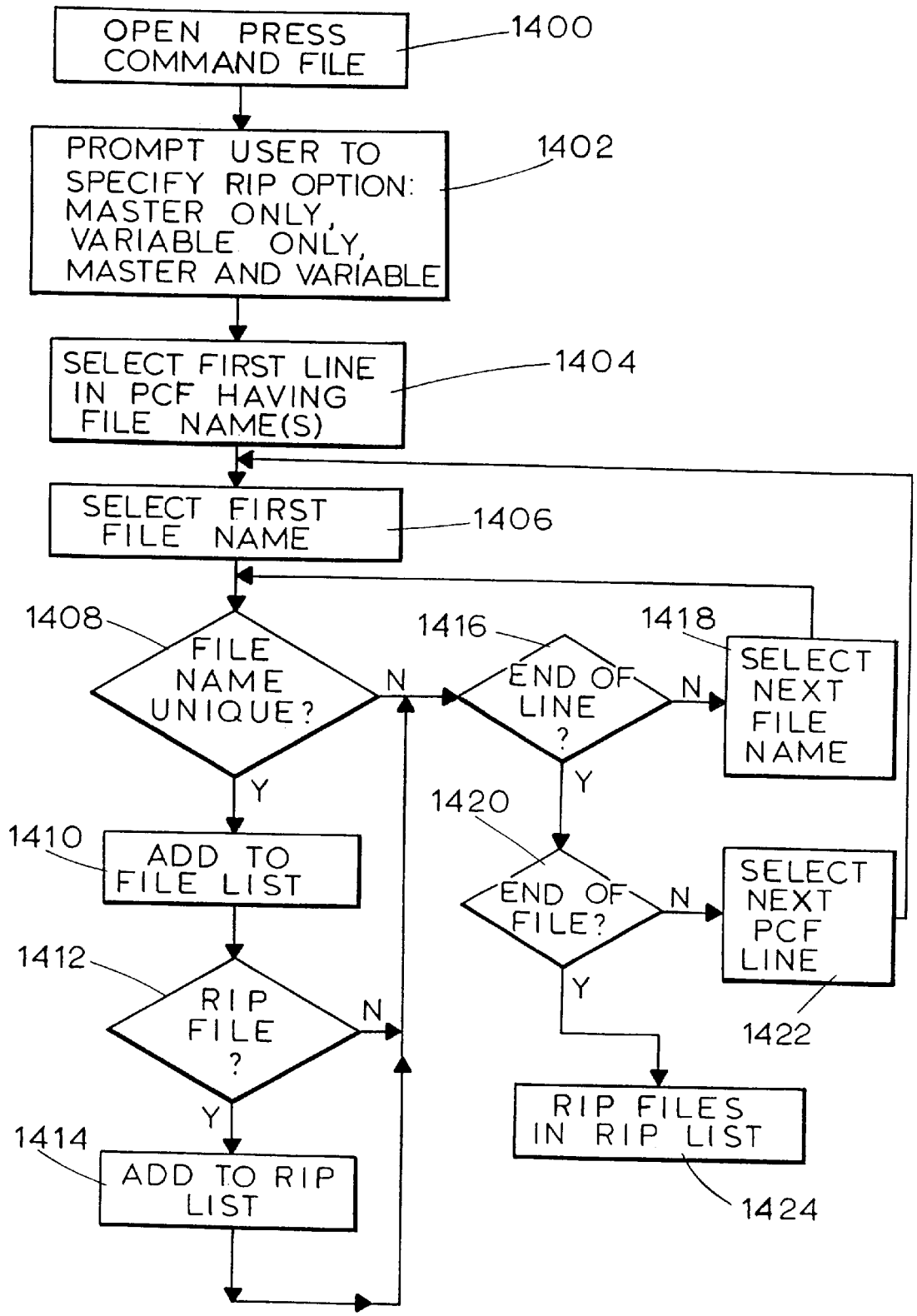
FIG. 12 illustrates programming executed by the control unit of 52 of FIG. 3 to convert page files into bitmap format.

FIG. 12 illustrates programming which may be executed by the control unit 18 of FIG. 3 to facilitate conversion of the imposed page files 1124 and 1139 into bitmap format using the RIP 118 of FIG. 4. The programming begins at a block 1400 which opens the press command file stored in the memory 19. A block 1402 then prompts a user to specify options which are available using the RIP 118. The options include the ability to convert only master page files, only variable page files or both master and variable page files into bitmap format. A block 1404 then selects the first line in the press command file having at least one file name therein. Thereafter, a block 1406 selects a first file name and a block 1408 checks a file list stored in the memory 19 to see if the file name has been previously placed in the list. If this is not the case, then this is the first time the file name has been encountered in the programming of FIG. 12. Thus, a block 1410 adds the file name to the file list and a block 1412 checks the user-specified options set by the block 1402 to determine whether the file should be converted into bitmap format. If so, a RIP list stored in the memory 19 is updated by adding the file name thereto and control passes to a block 1416. Control also passes to the block 1416 from the block 1412 bypassing the block 1414 if the file is not to be converted into bitmap format, and from the block 1408 if the file name currently under consideration is already in the file list.

The block 1416 checks to determine whether the end of the current line in the press command file has been reached. If not, a block 1418 selects the next file name in the line and control returns to the block 1408.

If the block 1416 determines that the end of the current line in the press command file has been reached, a block 1420 checks to determine whether the end of the press command file has been reached. If not, a block 1422 selects the next line in the press command file having at least one file name and control returns to the block 1406. On the other hand, if the end of the file has been reached, a block 1424 causes the RIP 118 to convert the files identified in the RIP list into bitmap format by issuing commands and files as appropriate to the RIP 118.

The present invention operates a demand printer to produce books of diverse publications in an order which allows such publications to obtain a high level of postal discounts. In addition, the use of the present system with a demand printer can facilitate bundling of a number of diverse publications to a single recipient to achieve additional postal discounts.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A system for operating an electronic press responsive to electronic representations of matter to be printed to produce a plurality of diverse publications from data stored in associated publication databases wherein the data stored in each publication database are ordered in a certain sequence, comprising:

means for establishing a job database having the data from the publication databases stored therein wherein such data are ordered in a job sequence specifying an order in which the matter is to be printed and wherein the job sequence is different than the certain sequences of the publication databases; and means for controlling the electronic press in accordance with the data in the job database and the job sequence.

2. The system of claim 1, wherein the data in the job database include postal information and wherein the establishing means comprises means for sorting the data according to the postal information.

3. The system of claim 2, wherein the sorting means comprises means for comparing the postal information to sort the data according to postal sort order.

4. The system of claim 1, wherein each publication comprises a number of books each to be sent to a recipient and the data in each database are arranged as a series of records each including information to produce a book and comprising a number of fields and wherein one or more of the fields comprise postal address of a recipient.

5. A system for operating an electronic press to produce a plurality of diverse publications from records stored in associated separate publication databases wherein each publication comprises at least one version of a number of books to be sent to recipients and each record includes a plurality of fields including a recipient address field comprising:

first means for establishing a job database;

second means for establishing a sort table;

means for loading the sort table with data from recipient address fields from the publication databases;

means for comparing data in the sort table to determine a postal sort order for records from the publication databases;

means for storing the records from the publication databases in the job database such that the records are ordered in the postal sort order; and means for controlling the electronic press in accordance with the records in the job database and the postal sort order.

6. The system of claim 5, further including means for calculating postal discounts from the records in the job database and the postal sort order.

7. A method of controlling an electronic press responsive to electronic representations of matter to be printed in accordance with first and second publication databases wherein each database includes data ordered in a certain sequence and defining books of an associated publication, the method comprising the steps of:

assembling the data from the first and second publication databases into a job database wherein the data are ordered in the job database in a job sequence specifying an order in which the matter is to be printed and wherein the job sequence is different than the certain sequences; and operating the electronic press to produce books in accordance with the job sequence.

8. The method of claim 7, wherein the books are to be delivered to recipient addresses and the step of assembling includes the step of determining postal sort order of the recipient addresses.

9. The method of claim 8, including the further step of calculating postal discounts from the data in the job database and the postal sort order.

10. The method of claim 8, wherein the step of determining includes the step of comparing recipient addresses in a sort table.

11. The method of claim 7, wherein the data in the publication databases are arranged in fields under field headers and the step of assembling includes the step of establishing field headers for the job database from the field headers of the publication databases.

12. A system for operating an electronic press responsive to data representing a plurality of diverse publications to be produced, comprising:

means for specifying a production sequence of the plurality of diverse publications to achieve postal discounts; and means for controlling the electronic press to produce the plurality of diverse publications in the production sequence.

13. The system of claim 12, wherein the plurality of diverse publications are to be delivered to recipient addresses and the specifying means includes means for determining postal sort order of the recipient addresses.

14. The system of claim 13, wherein the determining means includes means for comparing the recipient addresses in a sort table.

15. The system of claim 12, wherein each publication comprises a number of books each to be sent to a recipient having a postal address and the specifying means includes means for sorting the recipient postal addresses to specify the production sequence.

* * * * *